United States Patent
Noureldin et al.

(10) Patent No.: US 7,873,443 B2
(45) Date of Patent: *Jan. 18, 2011

(54) SYSTEM, METHOD AND PROGRAM PRODUCT FOR TARGETING AND OPTIMAL DRIVING FORCE DISTRIBUTION IN ENERGY RECOVERY SYSTEMS

(75) Inventors: Mahmoud Bahy Noureldin, Dhahran (SA); Ahmed Saleh Aseeri, Damman (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,255

(22) Filed: Mar. 1, 2010

(65) Prior Publication Data

US 2010/0223198 A1 Sep. 2, 2010

Related U.S. Application Data

(63) Continuation of application No. 11/768,084, filed on Jun. 25, 2007, now Pat. No. 7,698,022.

(60) Provisional application No. 60/816,234, filed on Jun. 23, 2006.

(51) Int. Cl.
*G06F 19/00* (2006.01)
*G05D 9/00* (2006.01)
*G05D 11/00* (2006.01)

(52) U.S. Cl. .............. 700/291; 700/278; 700/299; 60/206; 60/266; 60/267

(58) Field of Classification Search ............. 700/278, 700/291, 299; 60/206, 266, 267
See application file for complete search history.

(56) References Cited

U.S. PATENT DOCUMENTS 4,142,108 A * 2/1979 Matthews .............. 290/1 R
7,125,540 B1 * 10/2006 Wegeng et al. ........... 423/650

(Continued)

FOREIGN PATENT DOCUMENTS

NZ            527244           7/2003

(Continued)

OTHER PUBLICATIONS

"Optimization Application: Pinch Technology Analysis", Excerted from chapter 9 of "Optimum Design and Design Strategy", pp. 414-433.*

(Continued)

*Primary Examiner*—Michael D Masinick
(74) *Attorney, Agent, or Firm*—Bracewell & Giuliani LLP

(57) ABSTRACT

A system, methods, and user-friendly program product to optimize energy recovery or a process or cluster of processes under all possible process changes and stream-specific minimum temperature approach values without enumeration, are provided. The program product can utilize stream-specific minimum temperature approach values $\Delta T_{min}^{i}$, where the superscript i represents the specific hot stream, as the optimization parameters instead of the single global $\Delta T_{min}$ currently used, in addition to identifying the optimal operating conditions. The program product can determine optimal global minimum energy utility values and define optimal process conditions and an optimal driving force distribution in heat recovery systems, and can produce an optimal Pareto-curve that shows the rigorous trade off between energy cost and capital cost for any energy recovery system.

30 Claims, 15 Drawing Sheets

U.S. PATENT DOCUMENTS

2008/0163625 A1* 7/2008 O'Brien ................. 60/651

FOREIGN PATENT DOCUMENTS

| WO | WO 0108054 | 1/2001 |
|---|---|---|
| WO | WO 2005010783 | 3/2005 |

OTHER PUBLICATIONS

"Pinch Location and minimum temperature approach for discontinuous composite curves", Lakshmanan et al, Department of chemical engineering, The University of Edinburgh, UK. Mar. 17, 2002.*

"Optimization of CHP systems using pinch technology", Saboo et al, SRM University, Chennai India, date not known.*

"Energy Recovery by punch technology", Matijaseviae et al, Univeristy of Zagreb, Croatia, Sep. 17, 2001.*

Canmet Energy Technology Center, "Pinch Analysis: For the Efficient Use of Energy, Water & Hydrogen"; 2003, http://cetc-varennes.nrcan.gc.ca.

Aspentech: "Understanding Process and Design Interactions," Sep. 2002.

L March, "Inroduction to Pinch", date unknown.

Ravagnani, Mass et al., "Heat Exchanger Network Synthesis and Optimisation Using Genetic Algorithm", May 1, 2005, Applied Thermal Engineering.

DeRuyck, et al., Broadening the Capabilities of a Pinch Analysis Through Virtual Heat Exchanger Networks, Energy Conversion & Management 44 (2003) 2321-2329.

Lagaros, et al., Multi-objective Design Optimization Using Cascade Evolutionary Computations, Comput. Methods Appl. Mech. Engrg. 194 (2005) 3496-3515.

Petchers, N., An Integrated Approach to Energy Resource Optimization, Chapter 8, Combined Heating, Cooling & Power Handbook; Technologies & Applications (2003).

Serna, et al., An Area Targeting Algorithm for the Synthesis of Heat Exchanger Networks, Chemical Engineering Science 59 (2004) 2517-2520.

Press, W.H., et al.; Chapter 10. Maximization of Maximization of Functions, Numerical Recipes in Pascal. Art of Scientific Computing, Cambridge, Cambridge Univ. Press, G. Jan. 1, 1989, pp. 274-334, XP-002122410.

* cited by examiner

| Stream | Ts | Tt | FCp |
|---|---|---|---|
| H1 | 400 | 320 | 2.5 |
| H2 | 370 | 320 | 3.8 |
| C1 | 300 | 420 | 2 |
| C2 | 300 | 370 | 2 |

Targets for $\Delta T_{min} = 10°K$:
$Qh_{min} = 65$ kW
$Qc_{min} = 75$ kW

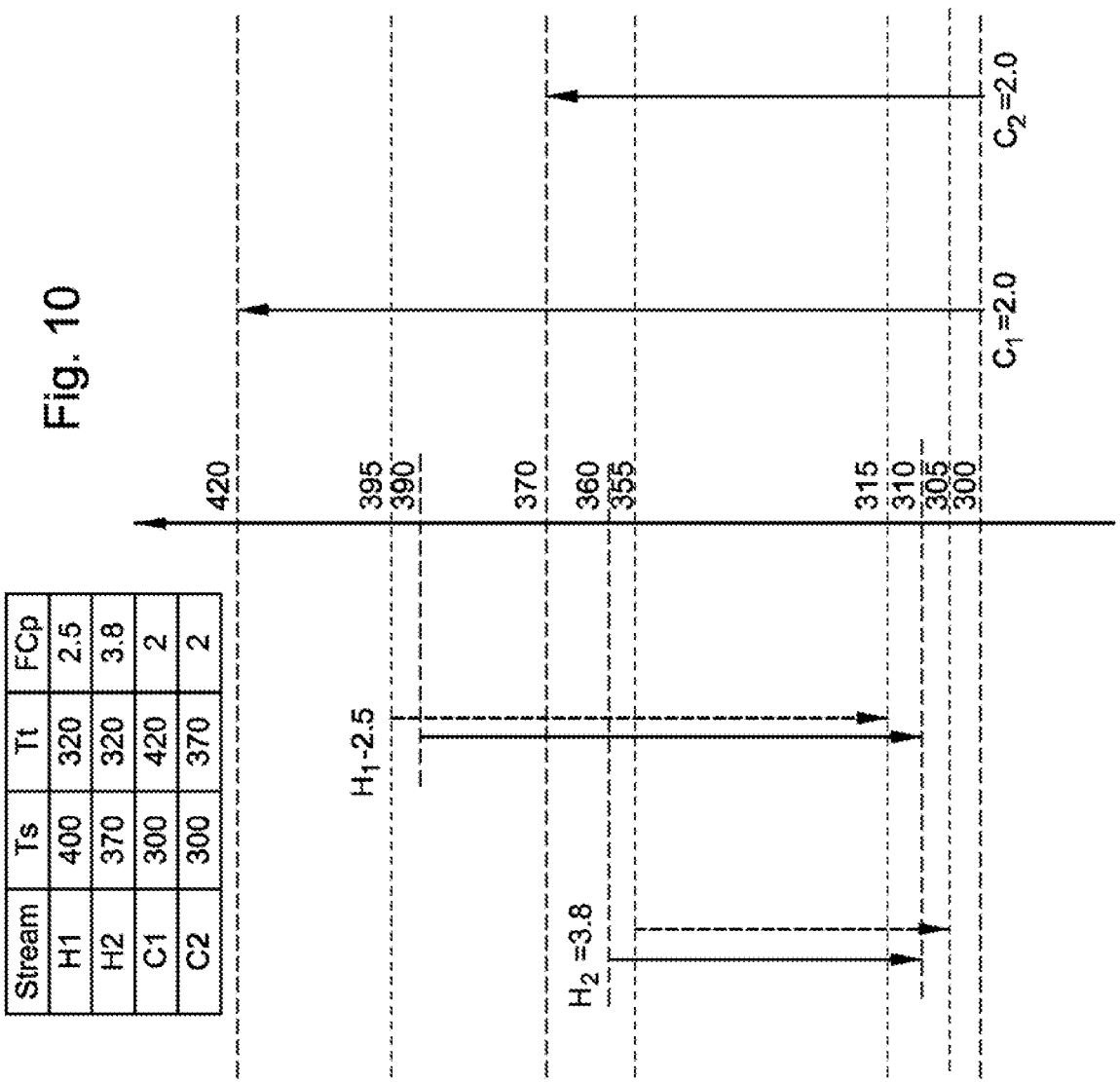

Hot Streams
$\Delta T_{min_i}$ (°K)

$H1 = 15$ °K,
$H2 = 5$ °K,

| Stream | Ts | Tt | FCp |
|---|---|---|---|
| H1 | 400 | 320 | 2.5 |
| H2 | 370 | 320 | 3.8 |
| C1 | 300 | 420 | 2 |
| C2 | 300 | 370 | 2 |

Targets for $\Delta T_{min_i}$:
$Qh_{min}$ = ~~65 kW~~        70 kW;
$Qc_{min}$ = ~~75 kW~~        80 kW;

Both increased!

Fig. 12

Hot Streams
$\Delta T_{min_i}$ (°K)

$H1 = 5$ °K,
$H2 = 15$ °K,

| Stream | Ts | Tt | FCp |
|---|---|---|---|
| H1 | 400 | 320 | 2.5 |
| H2 | 370 | 320 | 3.8 |
| C1 | 300 | 420 | 2 |
| C2 | 300 | 370 | 2 |

Targets for $\Delta T_{min_i}$:
$Qh_{min}$ = ~~65 kW~~        60 kW;
$Qc_{min}$ = ~~75 kW~~        70 kW;

Both decreased!

Fig. 13

| Stream | Ts | Tt | FCp |
|---|---|---|---|
| H1 | 400 | 320 | [2.0 : 3.0] |
| H2 | 370 | 320 | [3.5 : 4.0] |
| C1 | 300 | 420 | [1.8 : 2.2] |
| C2 | 300 | 370 | [1.7 : 2.2] |

Targets for $\Delta T_{min_i} = 10°K$:
$Qh_{min} = [54 : 94]$ kW
$Qc_{min} = [11 : 159]$ kW

Fig. 14

Hot Streams
$\Delta T_{min_i}$ (°K)

H1= 15 °K,
H2= 5 °K,

| Stream | Ts | Tt | FCp |
|---|---|---|---|
| H1 | 400 | 320 | [2.0 : 3.0] |
| H2 | 370 | 320 | [3.5 : 4.0] |
| C1 | 300 | 420 | [1.8 : 2.2] |
| C2 | 300 | 370 | [1.7 : 2.2] |

Targets for $\Delta T_{min_i}$:
$Qh_{min} = [54 : 94]$ kW    [63 : 92] kW;
$Qc_{min} = [11 : 159]$ kW    [9 : 168] kW;

Fig. 15

Hot Streams
$\Delta T_{min_i}$ (°K)

H1= 5 °K,
H2= 15 °K,

| Stream | Ts | Tt | FCp |
|---|---|---|---|
| H1 | 400 | 320 | [2.0 : 3.0] |
| H2 | 370 | 320 | [3.5 : 4.0] |
| C1 | 300 | 420 | [1.8 : 2.2] |
| C2 | 300 | 370 | [1.7 : 2.2] |

Targets for $\Delta T_{min_i}$:
$Qh_{min} = [54 : 94]$ kW    [45 : 96] kW;
$Qc_{min} = [11 : 159]$ kW    [13 : 150] kW;

Fig. 16

Energy Targeting while using stream-specific
minimum approach temperatures $\Delta Tmin_i$

| Stream | Ts | Tt | FCp |
|---|---|---|---|
| H1 | 400 | 320 | [2.0 : 3.0] |
| H2 | 370 | 320 | [3.5 : 4.0] |
| C1 | 300 | 420 | [1.8 : 2.2] |
| C2 | 300 | 370 | [1.7 : 2.2] |

Targets for $\Delta Tmin_i$ [5 : 15] °K:
$Qh_{min}$ = [54 ~~: 94~~] kW      [45 : 145] kW;
$Qc_{min}$ = [11 ~~: 159~~] kW      [0 : 220] kW;

Fig. 17

| Stream | Ts | Tt | FCp |
|---|---|---|---|
| H1 | [402 : 405] | [319 : 321] | [2.0 : 3.0] |
| H2 | [368 : 373] | [318 : 323] | [3.5 : 4.0] |
| C1 | [298 : 303] | [420 : 423] | [1.8 : 2.2] |
| C2 | [296 : 301] | [368 : 375] | [1.7 : 2.2] |

Targets for $\Delta Tmin$ 10 °K:
$Qh_{min}$ = [45 ~~: 129~~] kW
$Qc_{min}$ = [0 ~~: 199~~] kW

Fig. 18

| Stream | Ts | Tt | FCp |
|---|---|---|---|
| H1 | [402 : 405] | [319 : 321] | [2.0 : 3.0] |
| H2 | [368 : 373] | [318 : 323] | [3.5 : 4.0] |
| C1 | [298 : 303] | [420 : 423] | [1.8 : 2.2] |
| C2 | [296 : 301] | [368 : 375] | [1.7 : 2.2] |

Targets for $\Delta Tmin_i$ [5 : 15] °K:
$Qh_{min}$ = [45 ~~: 129~~] kW      [36 : 184.5] kW;
$Qc_{min}$ = [0 ~~: 199~~] kW      [0 : 260.3] kW;

| Active | ID | Flow Name | Type | Temp. In °K | Temp. Out °K | FCP W/(°K) | Enthalpy Min W | Enthalpy Max W | Hot Streams ΔTmin=15:15K |
|---|---|---|---|---|---|---|---|---|---|
| Active | 0 | | Hot | 387.00 : 400.00 | 304.00 : 318.00 | 2.00 : 3.00 | 142.00 | 288.00 | ΔTmin=15:15K |
| Active | 1 | | Hot | 353.00 : 368.00 | 303.00 : 318.00 | 3.50 : 4.00 | 122.50 | 280.00 | |
| Active | 2 | | Cold | 298.00 : 303.00 | 420.00 : 423.00 | 1.80 : 2.20 | 210.60 | 275.00 | |
| Active | 3 | | Cold | 296.00 : 301.00 | 368.00 : 373.00 | 1.70 : 2.20 | 113.50 | 173.80 | |

↑ 161    ↑ 163    ↑ 165

Heating 36.00 : 184.30 W    Cooling 0.00 : 259.50 W

Pareto-Curve

SYSTEM, METHOD AND PROGRAM PRODUCT FOR TARGETING AND OPTIMAL DRIVING FORCE DISTRIBUTION IN ENERGY RECOVERY SYSTEMS

RELATED APPLICATIONS

This non-provisional application is a continuation of U.S. patent application Ser. No. 11/768,084, filed on Jun. 25, 2007, titled "System, Method, and Program Product for Targeting and Optimal Driving Force Distribution in Energy Recovery Systems," which claims priority to and the benefit of U.S. Provisional Patent Application No. 60/816,234, filed Jun. 23, 2006, titled "Method and Program Product for Targeting and Optimal Driving Force Distribution in Energy Recovery Systems," and is related to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topoloy for Future Retrofit," and U.S. patent application Ser. No. 12/575,743, filed Oct. 8, 2009, titled "System, Method, and Program Product for Targeting and Identification of Optimal Process Variables in Constrained Energy Recovery Systems," each incorporated herein by reference in its entirety.

BACKGROUND OF THE INVENTION

1. Field of the Invention

This present invention relates to the field of energy recovery systems and related methods.

2. Description of the Related Art

Many different types of processes consume energy to obtain an output result, or to produce a required product or compound. For example, chemical processes consume energy to provide a desired result. For large scale processes which consume significant amounts of energy, it is preferable to minimize the energy consumed where possible. In the case of, for example, electrical energy generation systems or relatively large manufacturing plant or factories, it is preferable to optimize and potentially minimize the consumption of energy through careful operation, design or reconfiguration of the plant and equipment used.

For example, in some industrial manufacturing processes, specific streams of material flows need to be supplied to different types of equipment and machinery at specific temperatures. These material flows may need to be heated or cooled from an original starting temperature to a target temperature. This in turn will require the consumption of energy to cool specific streams, and also to heat other specific streams.

The total energy employed or consumed by the processes can be optimized to a global minimal level through, for example, careful placement and configuration of specific material streams with respect to one another. For example, there may be the potential for hot streams that require cooling to be placed in proximity with cold streams that require heating. Thermal energy already present in streams that needs to be removed, or streams that need to have heat added, can therefore be associated with one another to optimize the energy consumption of the process. In addition, the minimum temperature differences between hot streams and cold streams upon optimization can also result in huge savings in energy consumption.

These considerations can be taken into account during the energy targeting phase prior to design, or alternatively, during the reconfiguration or refitting of the plant or equipment. It is preferable to consider these optimization issues with a modeling system prior to the actual design, redesign, construction or modification of the actual plant and equipment.

The state-of-the-art software currently on the market includes AspenTech Inc. software known as Aspen Pinch, Hyprotech Inc. software known as HX-NET (acquired by AspenTech), Pinch Express of KBC and Sprint of UMIST. In the targeting phase, these software products allow specific stream conditions of a process to be tracked and individual operational attributes associated with these streams to be modeled and adjusted, if required. In general terms, such software products are normally employed to track the temperatures and heat capacity flows of specific material streams in a process. Although such software provides useful tools, they are not particularly flexible in application, and do not address some of the above problems systematically.

For example, in grassroots heat exchanger network design, the parameter known as global $\Delta T_{min}$ (minimum approach temperature) is typically used in the state-of-the-art commercial software to represent the desired level of heat recovery between hot and cold streams, such as, for example, the minimum temperature difference allowed to recover energy through a heat exchanger. A single value for a specific material stream attribute can only be adjusted at one time including the $\Delta T_{min}$. This forces a user of the system to employ a trial and error approach through 'tweaking' particular attributes of specific streams one at a time, to hopefully arrive at an optimized value for Q, and/or $Q_h$, which represent the total energy consumed for heating ($Q_h$) and the total energy consumed for cooling ($Q_c$) for the process model at optimal driving force distribution between the hot and the cold streams. This limitation becomes compounded and makes the existing software difficult to employ effectively in large-scale processes, which employ many material streams, where these material streams may have a number of operational attributes which can be modeled and adjusted. This is also the case when several sets of stream-specific minimum temperature approaches need to be analyzed for optimal driving force distribution determination in the studied energy system.

Further, process stream changes not only may result in a reduction in energy utility, but also may bring a reduction in $\Delta T_{min}$. Thus, in current state-of-the-art technology, the capital/energy trade-off in energy system synthesis must be readjusted after each process change. Recognized by the inventors is that the change in the driving force distribution due to both stream-specific $\Delta T_{min}$ and each process change also affects the utility level selection. The problem is interlinked and multi-dimensional in that process changes and stream-specific $\Delta T_{min}$ selection are competing for optimal selection of utilities, optimal process conditions, and optimal energy recovery system synthesis.

Two main methods are currently in use to address such issues: mathematical programming and thermodynamic-heuristics based pinch technology. Both methods fail to solve the problem of finding optimal driving force distribution, systematically, due to both optimal process conditions and optimal stream-specific $\Delta T_{min}$ in energy systems and without manual iteration. Optimal driving force distribution in energy systems comes from the combined effect of the system's process conditions and hot and cold stream minimum approach temperatures $\Delta T_{min}$. Optimal driving force distribution in energy systems can have a significant impact on energy consumption, utility selection, utility systems, and energy recovery systems capital investment. Therefore, recognized by the inventors is that any proposed method for optimal energy recovery systems design/retrofit and optimization should address these issues systematically and without enumeration.

Currently, there are no methods or program products that can handle the theoretical, practical, and economical energy targeting problems under variable driving force distribution to find optimal distribution without manual iterations (manual data entry-trial and error) and in a user-friendly manner.

NZ Patent No. 527,244 (July 2004) and WO Application No. 2005/010,783 (February 2005) have addressed the problem of energy targeting to find an optimal driving force distribution due to process conditions optimization, but only for a global $\Delta T_{min}$, and not for stream-specific $\Delta T_{min}$. Other prior teachings have suggested using heuristics to find the energy utility targets and an optimal driving force distribution at constant process conditions and stream-dependent $\Delta T_{min}$. Still other prior teachings have tried to find an optimal driving force distribution through process conditions optimization at a fixed global $\Delta T_{min}$ using mathematical programming.

Recognized by the inventors, however, is that in most industrial processes, it is at least inefficient, if not impractical, to require that all heat exchangers (and thus, all process streams and utilities) obey the same global minimum value for driving forces, since streams (and utilities) in general have very different heat transfer coefficients. Quite often, the difference in film heat transfer coefficients can be several orders of magnitude. Thus, some heat exchangers require large $\Delta T_{min}$ values in order to avoid requiring an excessive heat transfer area, while other units will manage well with much smaller $\Delta T_{min}$ values. In addition, the hot stream-specific minimum approach temperature optimal set can lead to much better energy consumption targets.

When considering retrofitting, the same problems exist with still no practical solution to simultaneously finding energy targets under all possible combinations of different process conditions, while using stream-specific minimum approach temperatures ($\Delta T_{min}^i$).

Some scientists have recognized the need for at least assigning individual contributions to the minimum driving forces for each stream and utility, based upon the heat transfer coefficient of matched streams. These $\Delta T_{min}$ contributions may not only reflect heat transfer conditions, but may be used to represent the need for expensive materials of construction, heat exchanger types, etc. These methods, however, are based upon heuristics and are iterative, lack systemization, and do not consider the possible changes in process conditions that can result in significant changes in the energy system driving force distribution.

Recognized by the inventors is that it would be beneficial to have a system, method and program product that utilizes both process conditions manipulation and stream-specific minimum approach temperatures $\Delta T_{min}^i$ to target for energy consumption, utility selection and design heat recovery systems at an optimal driving force distribution systematically, without manual iteration or enumeration, without customized modeling, and in a user friendly manner.

SUMMARY OF THE INVENTION

In view of the foregoing, embodiments of the present invention advantageously provide an improved method, system and program product for theoretical, practical and economical energy targeting for the design and retrofit of energy recovery systems to find global energy utility targets, establish a good starting point for energy system design/retrofit using desired levels of heat recovery, find optimal driving force distributions in the energy system which is a function of the combined effect of process conditions and stream-specific minimum approach temperatures $\Delta T_{min}^i$, and establish high fidelity relationship between energy cost versus capital cost to design energy recovery systems systematically and without enumeration.

Specifically, embodiments of the present invention provide a system to optimize energy recovery for a process or cluster of processes having a plurality of resource streams each having operational attributes. According to an embodiment of the present invention, such a system can include an energy utility modeling computer having a processor, and memory coupled to the processor to store software and database records therein, and a database stored in the memory (volatile or nonvolatile, internal or external) of or otherwise accessible to the energy modeling computer. The database can include a plurality of data points indicating potential ranges of values for operational attributes for each of a plurality of hot and cold process streams. These attributes can include, for example, a lower and an upper boundary value for a supply temperature (Ts) of each of the process streams, a lower and an upper boundary value for a target temperature (Tt) of each of the process streams, a lower and an upper boundary value for a heat capacity flow rate (FCp) of each of the process streams. The database can also include one or more sets of values including lower and upper stream-specific minimum temperature approach boundary values ($\{\Delta T_{min}^i [L:H]\}$) and/or a plurality of heat exchanger network-level sets of stream-specific minimum temperature approach values collectively assigned to or otherwise associated with a same plurality of e.g., hot process streams.

The system can also include energy utility modeling program product either on a separate deliverable computer readable medium, e.g., DVD, etc., or stored in the memory of the energy utility modeling computer and adapted to optimize energy recovery for the process. The energy utility modeling program product can include instructions that when executed, for example, by the energy utility modeling computer, cause the computer to perform various operations to optimize energy recovery for a process or cluster of processes having a plurality of process streams. The operations can include, for example, retrieving or otherwise receiving a potential range of attribute values for each of the process streams, and retrieving or otherwise receiving a plurality of process stream-specific minimum temperature approach values, typically in the form of a set of stream-specific boundary values ($\{\Delta T_{min}^i [L:H]\}$) assignable to a plurality of process streams. The operations can also include assigning each of a plurality of different combinations of stream-specific minimum temperature approach values to a corresponding same plurality of process streams, and determining at least one global minimum energy utility consumption value for each combination of the plurality of different combinations of the stream-specific minimum temperature approach values assigned the plurality of process streams.

According to an exemplary configuration, the at least one global minimum energy utility consumption value can include, for example, a global minimum heating energy utility value (Qh(minimum)) and/or a global minimum cooling energy utility value (Qc(minimum)) for each combination of the plurality of different combinations of the stream-specific minimum temperature approach values assigned the plurality of process streams. Further, according to the exemplary configuration, a significant portion of the plurality of different combinations of stream-specific minimum temperature approach values each include at least one, but more typically, a plurality of different minimum temperature approach values assigned, for example, to different combinations of corresponding process streams of the plurality of process streams or in a different process stream order to thereby form the different combinations of the process streams.

According to an embodiment of the program product, the operation of determining at least one global energy utility consumption value can include iteratively determining a separate global minimum heating energy utility value and a separate global minimum cooling energy utility value for each subset of a plurality of subsets of the plurality of combinations of the stream-specific minimum temperature approach values assigned the plurality of process streams, through automated processes, and selecting a set of minimum temperature approach values from within each subset of the plurality of subsets of the plurality of combinations of stream-specific minimum temperature approach values that renders a minimum increase in the more expensive of the global minimum heating energy and the global minimum cooling energy values associated therewith over that of a prior selected set of stream-specific minimum temperature approach values of a prior analyzed subset of the plurality of subsets of the plurality of combinations of stream-specific minimum temperature approach values.

According to an embodiment of the program product, in order to determine the at least one global minimum energy utility consumption value for each combination of the plurality of different combinations of the stream-specific minimum temperature approach values, the operations can include incrementally increasing the stream-specific minimum temperature approach value of each specific hot process stream by a preselected temperature interval (e.g., one degree), determining an effect on the global minimum heating energy utility value and/or the global minimum cooling energy utility value for each incrementally increased value, and then choosing or otherwise identifying the interim stream-specific minimum temperature approach value which provides the minimum increase in the more expensive of the global minimum heating or cooling energy utility values. Further, the operations can include repeating the operations of incrementally increasing the stream-specific minimum temperature approach value, determining an effect on the desired utility target, and choosing the interim stream-specific minimum temperature approach value providing the minimum increase in the more expensive of the global minimum heating or cooling energy utility values, for each other of the hot process streams.

According to an embodiment of the program product, the operations can include identifying the optimal combination of stream-specific minimum temperature approach values rendering the optimal global minimum energy utility value and the corresponding global minimum energy utility value rendered by the optimal combination of stream-specific minimum temperature approach values. The corresponding global minimum energy utility value rendered by the optimal combination of the stream-specific minimum temperature approach values can be either the global minimum heating energy utility value or the global minimum cooling energy utility value which provides the most economically desirable result, e.g., depending upon which utility is the more expensive utility. As such, according to a preferred configuration, the operations include those for separately determining the optimal combination of stream-specific minimum temperature approach values that render the global minimum heating energy utility value, and those for determining the optimal combination of stream-specific minimum temperature approach values that render the global minimum cooling energy utility value to thereby facilitate energy utility cost based selection of the optimal set of stream-specific minimum temperature approach values between the pair of optimal sets, which render the most energy cost efficient network design solution.

The operations can also include those for determining discrete process conditions that render the respective global minimum energy utility (driving force distribution) using, e.g., a collapsing intervals algorithm. For example, the operations can include determining a first set of discrete process conditions that provide a minimum global minimum heating energy utility (Qh(minimum)) defining a first driving force distribution, determining a second set of discrete, process conditions that renders the global minimum cooling energy utility (Qc(minimum)) defining a second driving force distribution, and calculating a first energy cost requirement associated with implementing the first set of process conditions and a second energy utility cost requirement associated with implementing the second set of process conditions, to thereby facilitate determining the optimal set of process conditions that provides a minimum total energy utility cost requirement. Correspondingly, the operations can advantageously also include selecting the set of process conditions from the first and second sets of process conditions that provide a minimum energy cost requirement responsive to determining the first and the second energy cost requirements associated with the first and the second process conditions, designing a heat exchanger network responsive to the selected set of process conditions, and determining the capital cost associated with the heat exchanger network to thereby facilitate a comparison of the trade-off between capital cost and energy cost.

According to an embodiment of the program product, in order to obtain a final set of optimal conditions, the operations can include, through automated processes, iteratively/incrementally determining the first and second sets of discrete process conditions, calculating the first and second energy cost requirements associated therewith, and selecting the set of process conditions providing the minimum energy cost requirement, for each of the plurality of combinations of stream-specific minimum approach values ($\Delta T_{min}^i$) falling within the potential range of stream-specific minimum approach values for each one of the plurality of process streams. Advantageously, such operations can draw or otherwise form data for a capital versus energy cost analysis, e.g., using a Pareto optimal chart, to determine an appropriate heat exchanger network based on a trade-off between capital cost and energy cost, and provide a decision-maker expected utility purchasing requirements based on that selection. The operations can further include designing a heat exchanger network responsive to the determined optimal set of process conditions and one or both of the first and the second sets of stream-specific minimum temperature approach values, and determining or otherwise identifying the capital cost associated with the heat exchanger network.

Embodiments of the present invention also advantageously provide methods to optimize energy recovery for a process or cluster of processes using a plurality of resource streams. An example of such a method according to an embodiment of the present invention can include the steps of retrieving or otherwise receiving a potential range of attribute values for each of the process streams, and retrieving or otherwise receiving a plurality of process stream-specific minimum temperature approach values, typically in the form of a set of stream-specific boundary values ($\{\Delta T_{min}^i [L:H]\}$) assignable to a plurality of process streams. The steps can also include assigning each of a plurality of different combinations of stream-specific minimum temperature approach values to a same plurality of process streams, and determining at least one global minimum energy utility consumption value for each combination of the plurality of different combinations of the stream-specific minimum temperature approach values assigned the plurality of process streams. According to an exemplary configuration, the at least one global minimum energy utility consumption value can include, for example, a global minimum heating energy utility value (Qh(minimum)) and/or a global minimum cooling energy utility value (Qc(minimum)) for each combination of the plurality of different combinations of the stream-specific minimum temperature approach values assigned the plurality of process streams. Further, according to the exemplary configuration, a significant portion of the plurality of different combinations of stream-specific minimum temperature approach values each include at least one, but more typically, a plurality of different minimum temperature approach values assigned, for example, to different combinations of the process streams within the plurality of process streams, or assigned to the same process streams within the plurality of process streams but in a different order to thereby form the different combinations of the process streams.

According to an embodiment of the method, the step of determining at least one global energy utility consumption value can include iteratively determining a separate global minimum heating energy utility value and a separate global minimum cooling energy utility value for each subset of a plurality of subsets of the plurality of combinations of the stream-specific minimum temperature approach values assigned the plurality of process streams, through automated processes, and selecting a set of minimum temperature approach values from within each subset of the plurality of subsets of the plurality of combinations of stream-specific minimum temperature approach values that renders a minimum increase in the more expensive of the global minimum heating energy and the global minimum cooling energy values associated therewith over that of a prior selected set of minimum temperature approach values of a prior analyzed subset of the plurality of subsets of the plurality of combinations of stream-specific minimum temperature approach values.

According to an embodiment of the method, in order to determine the at least one global minimum energy utility consumption value for each combination of the plurality of different combinations of the stream-specific minimum temperature approach values, the steps can include incrementally increasing the stream-specific minimum temperature approach value of each specific hot process stream by a preselected temperature interval (e.g., one degree), determining an effect on the global minimum heating energy utility value and/or the global minimum cooling energy utility value for each incrementally increased value, and then choosing or otherwise identifying the interim stream-specific minimum temperature approach value which provides the minimum increase in the more expensive of the global minimum heating or cooling energy utility values. Further, the steps can include repeating the steps of incrementally increasing the stream-specific minimum temperature approach value, determining an effect on the desired utility target, and choosing the interim stream-specific minimum temperature approach value providing the minimum increase in the more expensive of the global minimum heating or cooling energy utility values, for each other of the hot process streams.

According to an embodiment of the method, the steps can include identifying the optimal combination of stream-specific minimum temperature approach values rendering the optimal global minimum energy utility value, and the corresponding global minimum energy utility value rendered by the optimal combination of stream-specific minimum temperature approach values. The corresponding global minimum energy utility value rendered by the optimal combination of the stream-specific minimum temperature approach values can be either the global minimum heating energy utility value or the global minimum cooling energy utility value which provides the most economically desirable result, e.g., depending upon which utility is the more expensive utility. As such, according to a preferred configuration, the steps include those for separately determining the optimal combination of stream-specific minimum temperature approach values that render the global minimum heating energy utility value, and those for determining the optimal combination of stream-specific minimum temperature approach values that render the global minimum cooling energy utility value to thereby facilitate energy utility cost based selection of the optimal set of stream-specific minimum temperature approach values between the pair of optimal sets, which render the most energy cost efficient network design solution.

The method can also include steps for determining discrete process conditions that render the respective global minimum energy utility (driving force distribution) using, e.g., a collapsing intervals algorithm. For example, the method can include the steps of determining a first set of discrete process conditions that provide a minimum global minimum heating energy utility (Qh(minimum)) defining a first driving force distribution, determining a second set of discrete process conditions that renders the global minimum cooling energy utility (Qc(minimum)) defining a second driving force distribution, and calculating a first energy cost requirement associated with implementing the first set of process conditions and a second energy utility cost requirement associated with implementing the second set of process conditions, to thereby facilitate determining the optimal set of process conditions that provides a minimum total energy utility cost requirement. Correspondingly, the steps can advantageously also include selecting the set of process conditions from the first and second sets of process conditions that provides a minimum energy cost requirement responsive to determining the first and the second energy cost requirements associated with the first and the second process conditions, designing a heat exchanger network responsive to the selected set of process conditions, and determining the capital cost associated with the heat exchanger network to thereby facilitate a comparison of the trade-off between capital cost and energy cost.

According to an embodiment of the method, in order to obtain a final set of optimal conditions, the steps can include, through automated processes, iteratively/incrementally determining first and second sets of discrete process conditions, calculating the first and second energy cost requirements associated therewith, and selecting the set of process conditions providing the minimum energy cost requirement, for each of a plurality of combinations of stream-specific minimum approach values ($\Delta T_{min}^{i}$) falling within the potential range of stream-specific minimum approach values for each one of the plurality of process streams. Advantageously, such steps can draw or otherwise form data for a capital versus energy cost analysis, e.g., using a Pareto optimal chart, to determine an appropriate heat exchanger network based on a trade-off between capital cost and energy cost, and provide a decision-maker expected utility purchasing requirements based on that selection. The steps can further include designing a heat exchanger network responsive to the determined optimal set of process conditions and one or both of the first and the second sets of stream-specific minimum temperature approach values, and determining or otherwise identifying the capital cost associated with the heat exchanger network.

Advantageously, various embodiments of the present invention relate to methods and user-friendly program products to calculate global energy utility targets and define an optimal driving force distribution for a process or cluster of processes under all possible process changes and stream-specific minimum temperature approaches, simultaneously, and without enumeration. These embodiments can utilize stream-specific minimum temperature approaches $\Delta T_{min}^{i}$, where the superscript i represents the specific hot stream, as the optimization parameters, instead of the single global $\Delta T_{min}$ currently used by all the state-of-the-art software, in addition to identifying the optimal operating conditions. Various embodiments of the methods and program product can define optimal process conditions, an optimal driving force distribution in heat recovery systems, and an optimal pareto-curve that shows the rigorous trade off between energy cost and capital cost for any energy recovery system, without subjective assumptions such as, for example, systems depreciation time and future value of money.

Advantageously, various embodiments of the present invention can have several commercial benefits. For example, various embodiments of the present invention allow for application of a unique advanced methodology automated in a user-friendly program product to optimally design and efficiently operate process units and energy recovery system in industrial facilities. Industrial companies can improve energy efficiency consumption and pollution minimization points of view in designing and operating their facilities. An estimated 10% improvement in energy efficiency due to the application of various embodiments of this invention, which represents optimization beyond what is currently available from the state-of-art tools and technology, can result in savings estimated in the tens of millions of dollars per year in energy consumption and project capital.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 10 is a graph illustrating assignment of a specific (distinct) minimum approach temperature ($\Delta T_{min}^{i}$) to each hot resource stream of a process in a calculation for finding a global heating energy utility target requirement ($Q_h$) and a global cooling energy utility target requirement ($Q_c$) according to an embodiment of the present invention;

FIG. 11 is a block flow diagram illustrating the temperature steps of a cascading algorithm used in a calculation for finding a global minimum heating energy utility requirement ($Q_h$) and a global minimum cooling energy utility requirement ($Q_c$), according to an embodiment of the present invention;

FIGS. 12 and 13 are comparative tables illustrating how $Q_h$ and $Q_c$ differ according to the selection of the minimum approach temperature $\Delta T_{min}^{i}$ for hot resource streams H1 and H2 according to an embodiment of the present invention;

FIGS. 14-16 are comparative tables illustrating the effect of combining changes in heat capacity flowrate ($FC_p$) with different minimum approach temperatures $\Delta T_{min}^{i}$ for hot resource streams H1 and H2 according to an embodiment of the present invention;

FIG. 17 is a table illustrating comparative values of the $Q_h$ and $Q_c$ targets under all possible combinations of $FC_p$ changes for minimum approach temperatures $\Delta T_{min}^{i}$ between [5:15]° K. of for the H1 and H2 hot resource streams according to an embodiment of the present invention;

FIG. 18 is a table illustrating the $Q_h$ and $Q_c$ targets under variable supply temperature ($T_s$), target temperature output ($T_t$), and $FC_p$ conditions, but for same approach temperature of 10° K. for both H1 and H2 hot resource streams according to an embodiment of the present invention;

FIG. 19 is a table illustrating the $Q_h$ and $Q_c$ targets under variable process conditions and variable minimum approach temperatures $\Delta T_{min}^{i}$ according to an embodiment of the present invention;

FIG. 20 is a schematic diagram of an exemplary graphical user interface according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As shown in FIGS. 1-23, embodiments of the present invention provide a method, system and/or program product to be used to model the energy consumption of an industrial process to optimize heat/energy recovery within a process having a plurality of resource streams, through the determination of global energy utility targets and the determination of an optimal driving force distribution for the process. Those skilled in the art should appreciate that embodiments of the present invention may encompass specific hardware or apparatus used to implement the present invention in addition to a computer program product programmed into programmable logic or digital devices adapted to execute to a number of processing steps to achieve the aims of the invention.

As noted previously, and as perhaps best shown in FIGS. 3-6, the total energy employed or consumed by the processes can be optimized to a global minimal level through, for example, careful placement and configuration of specific material streams with respect to one another. Through analysis, such as through development and utilization of a set of composite curves (see, e.g., FIGS. 3-5) which provide temperature-enthalpy profiles of the availability in a process and the demands in the process, and through what is termed a "Pinch analysis" (see, e.g., FIG. 6), an optimal driving force distribution through process conditions optimization at a global $\Delta T_{min}$ (see, e.g., FIG. 7).

Figures 1, 7:
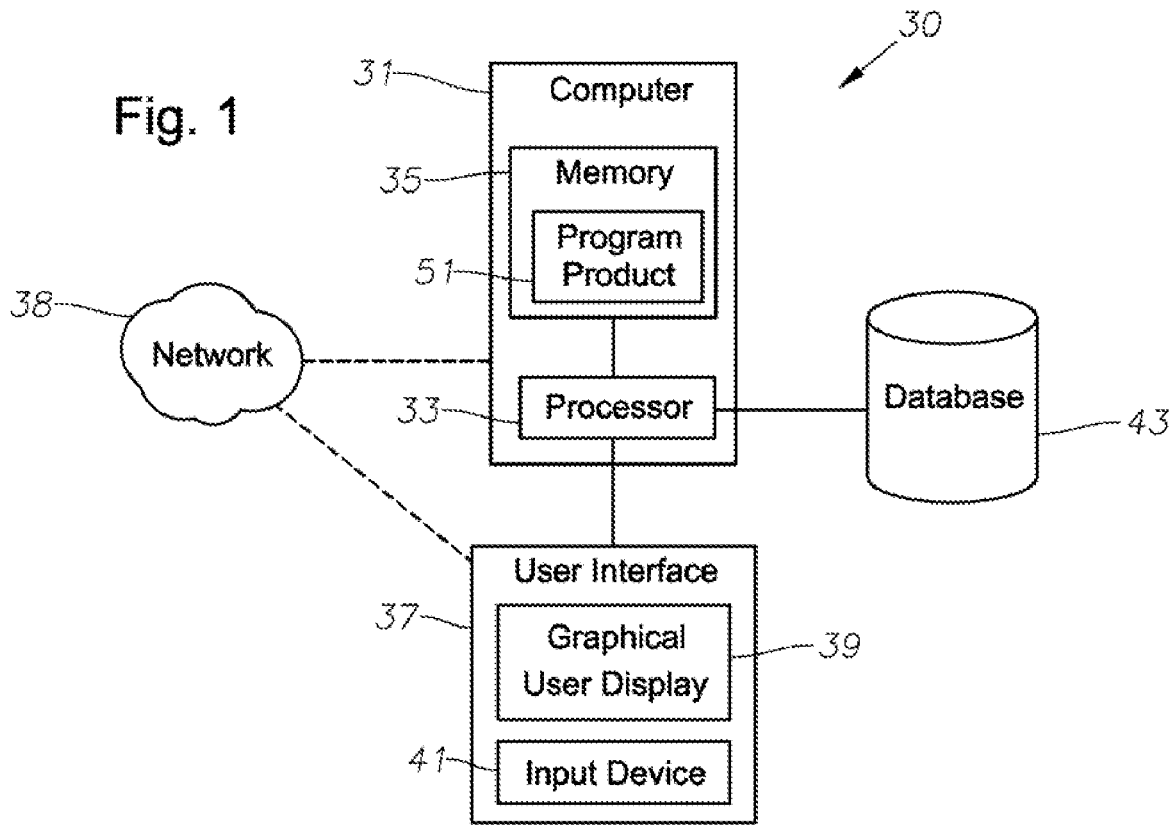
FIG. 1 is a schematic block diagram of a system to determine global energy utility targets and to define an optimal driving force distribution for a process having a plurality of resource streams according to an embodiment of the present invention.
FIGS. 3-9 are graphs and tables illustrating current methods used in Pinch technology.

As perhaps best shown in FIGS. 12 and 13, the global minimum heating energy utility $Qh_{min}$ and the global minimum cooling energy utility $Qc_{min}$, shown as 65 KW and 75 KW, respectively, in FIG. 7 for such system, however, may not be the optimal global minimum heating utility and/or global minimum cooling because not all heat exchangers (and thus, all process streams and utilities) need to obey the same global minimum value for driving forces, since streams (and utilities) in general have very different heat transfer coefficients.

Further, as perhaps best shown in FIGS. 14-19, process conditions need not, and usually are not, specific discrete values incapable of being adjusted or analyzed separately. Additional efficiencies, i.e., improved values for global minimum heating energy utility $Qh_{min}$ and the global minimum cooling energy utility $Qc_{min}$ can be found by utilizing both process conditions manipulation (see, e.g., FIGS. 15, 17, 19) and stream-specific minimum approach temperatures $\Delta T_{min}^i$ (see, e.g., FIGS. 12, 13, 15, 17, 19) to target for energy consumption, utility selection, and design heat recovery (e.g., heat exchange) systems, at an optimal driving force distribution.

FIG. 1 illustrates a system 30 to determine global energy utility targets and to define an optimal driving force distribution for a process having a plurality of resource streams. The system 30 can include an energy utility modeling computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server serving multiple user interfaces 37. Accordingly, the user interface 37 can be either directly connected to the computer 31 or through a network 38 as known to those skilled in the art.

The system 30 can also include a database 43 stored in the memory 35 (internal or external) of energy modeling computer 31 and having a plurality of sets of values each separately defining a potential range of values for at least one operational attribute for each of a plurality of hot resource streams and a plurality of sets of values each separately defining a potential range of values for at least one operational attribute for each of a plurality of cold resource streams. Such attributes can include, for example, a lower and an upper boundary value for a supply temperature (Ts) of each of the hot resource streams and each of the cold resource streams, a lower and an upper boundary value for a target temperature (Tt) of each of the hot resource streams and each of the cold resource streams, and/or a lower and an upper boundary value for a heat capacity flow rate (FCp) of each of the hot resource streams and each of the cold resource streams (see, e.g., FIG. 20).

The system 30 can also include energy utility modeling program product 51 stored in memory 35 of the energy utility modeling computer 31 and adapted to provide theoretical, practical, and economical energy targeting for the design and retrofit of energy recovery systems to find global energy utility targets, establish a good starting point for energy system design/retrofit using desired levels of heat recovery, find optimal driving force distributions in the energy system which is a function of the combined effect of process conditions and stream-specific minimum approach temperatures $\Delta T_{min}^i$ to optimize heat recovery for the process, and establish high fidelity relationship between energy cost versus capital cost to design energy recovery systems systematically and without the need for manual (trial and error) enumeration, inherent in other prior systems.

Note, the energy utility modeling program product 51 can be in the form of microcode, programs, routines, and symbolic languages that provide a specific set for sets of ordered operations that control the functioning of the hardware and direct its operation, as known and understood by those skilled in the art. Note also, the energy utility modeling program product 51, according to an embodiment of the present invention, need not reside in its entirety in volatile memory, but can be selectively loaded, as necessary, according to various methodologies as known and understood by those skilled in the art.

Figure 2:
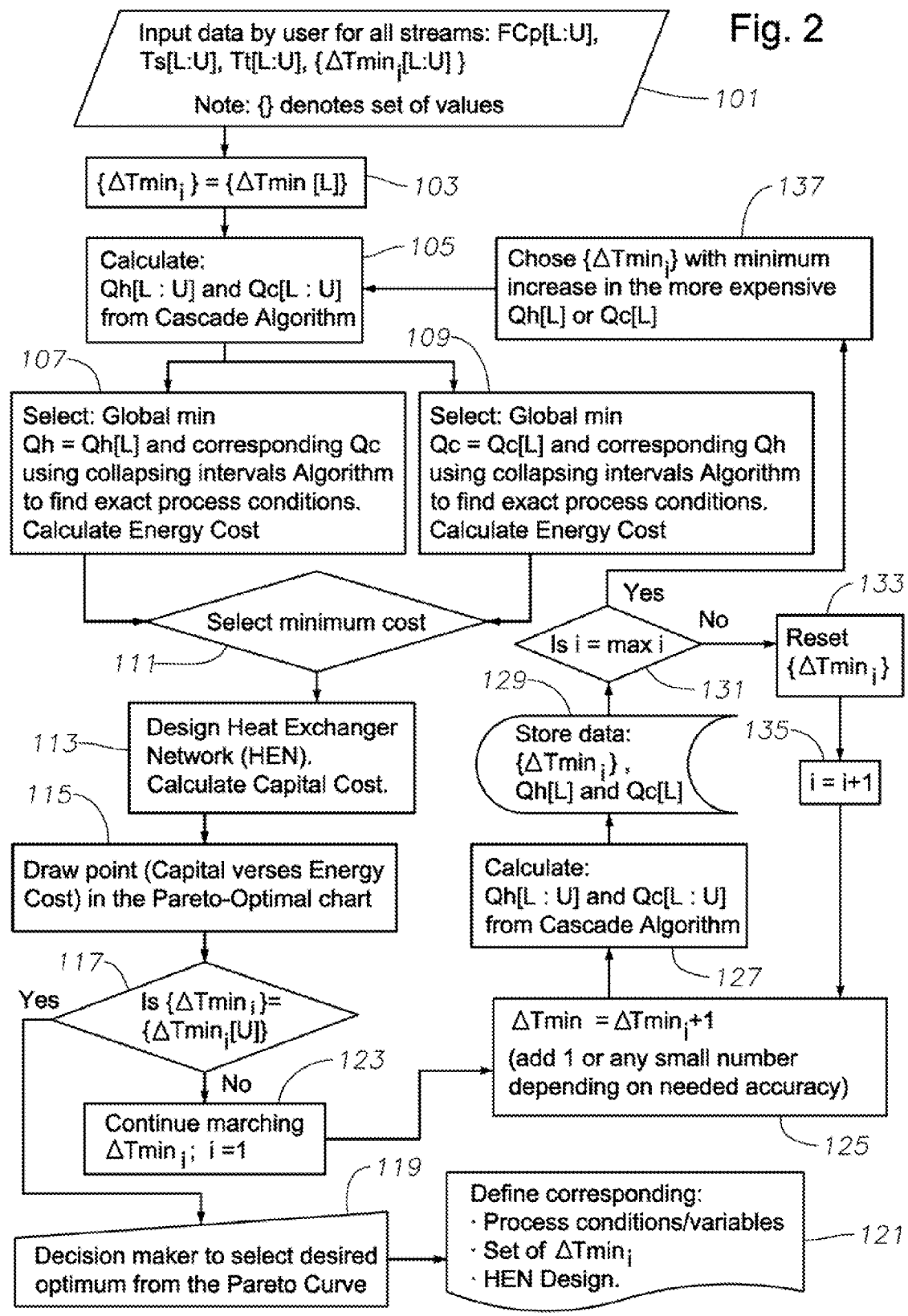
FIG. 2 is a schematic flow diagram of an energy utility modeling program product illustrating high-level functions according to an embodiment of the present invention.
Figure 3:
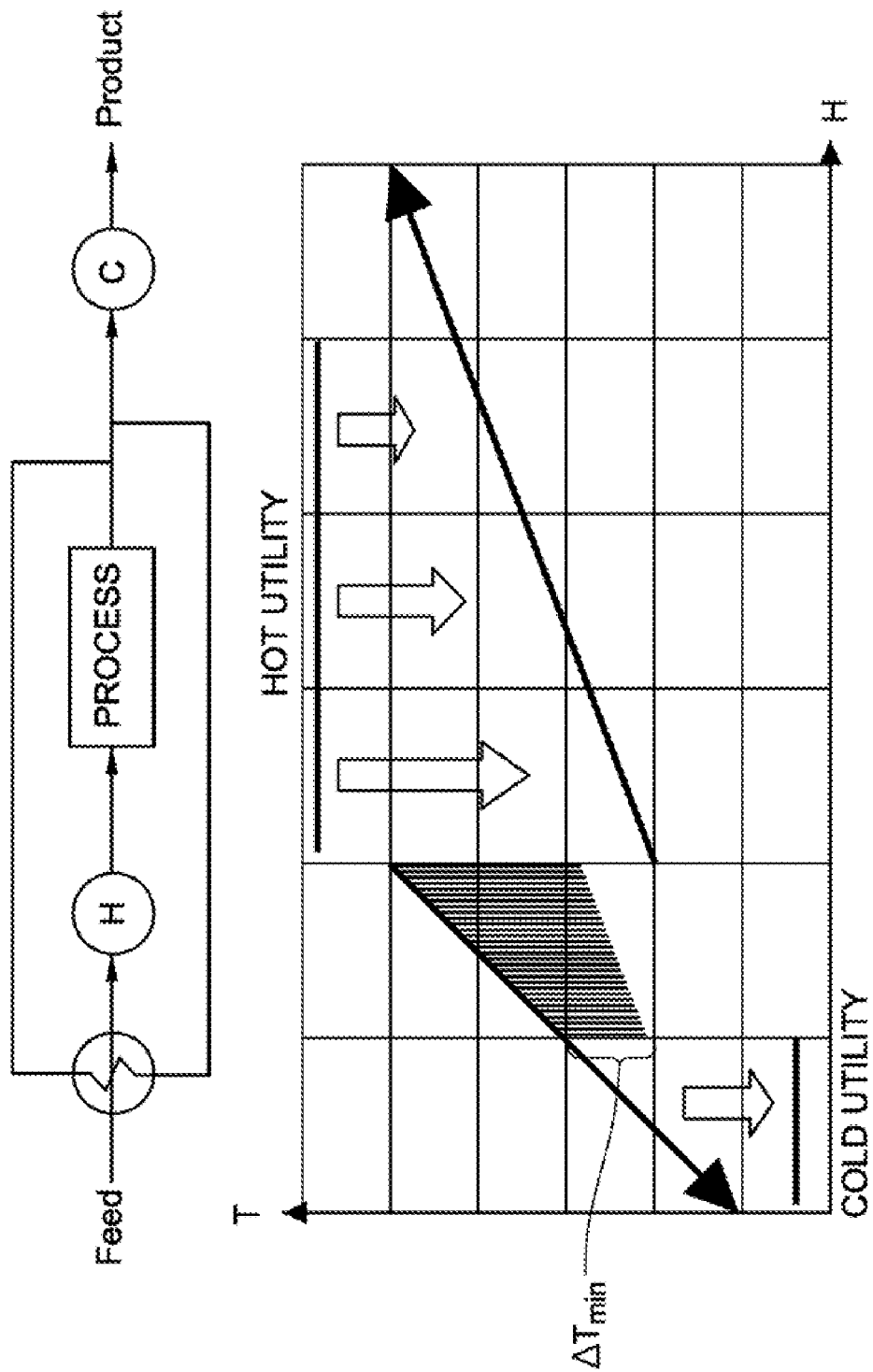
Figure 4:
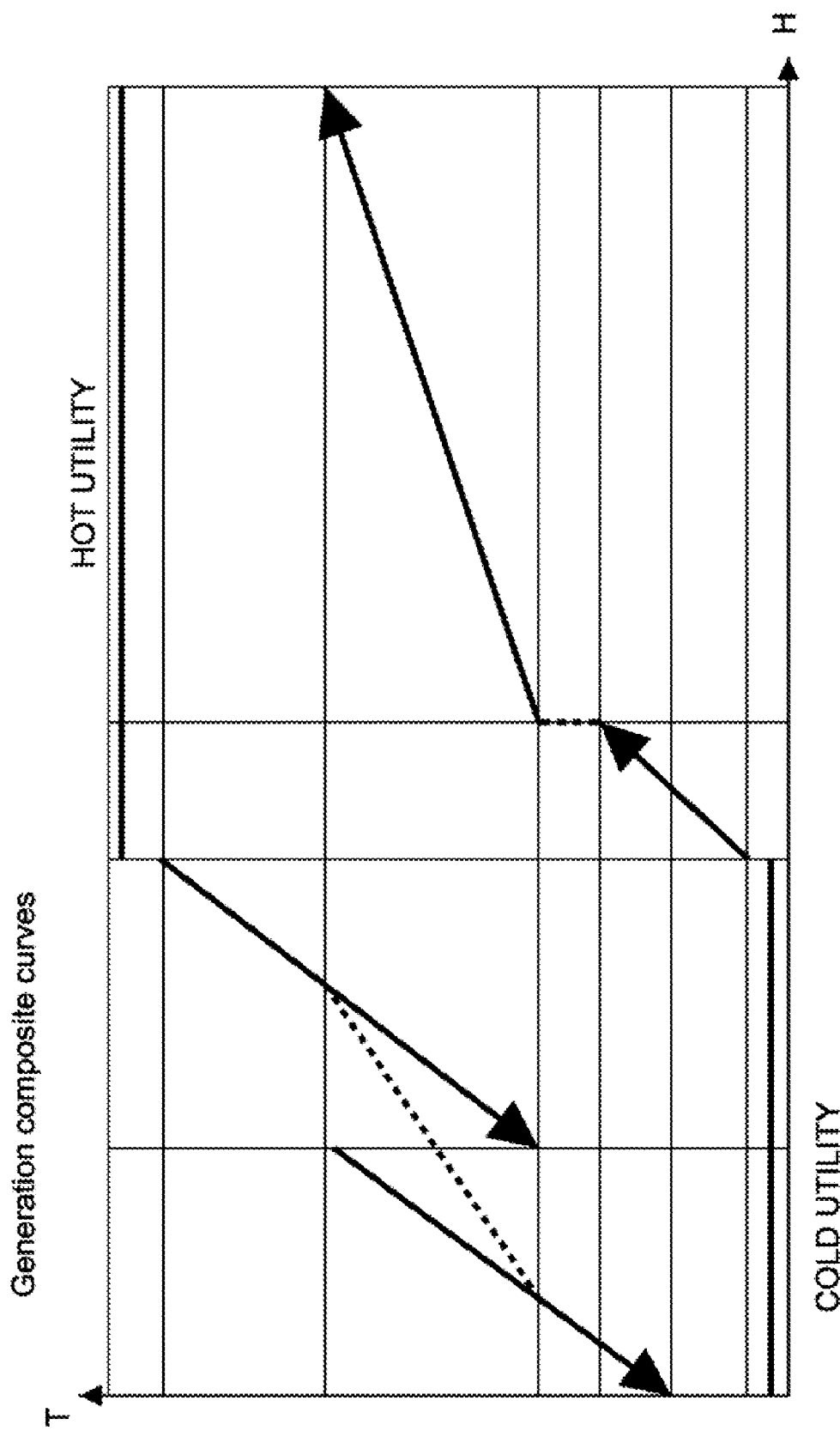
Figure 5:
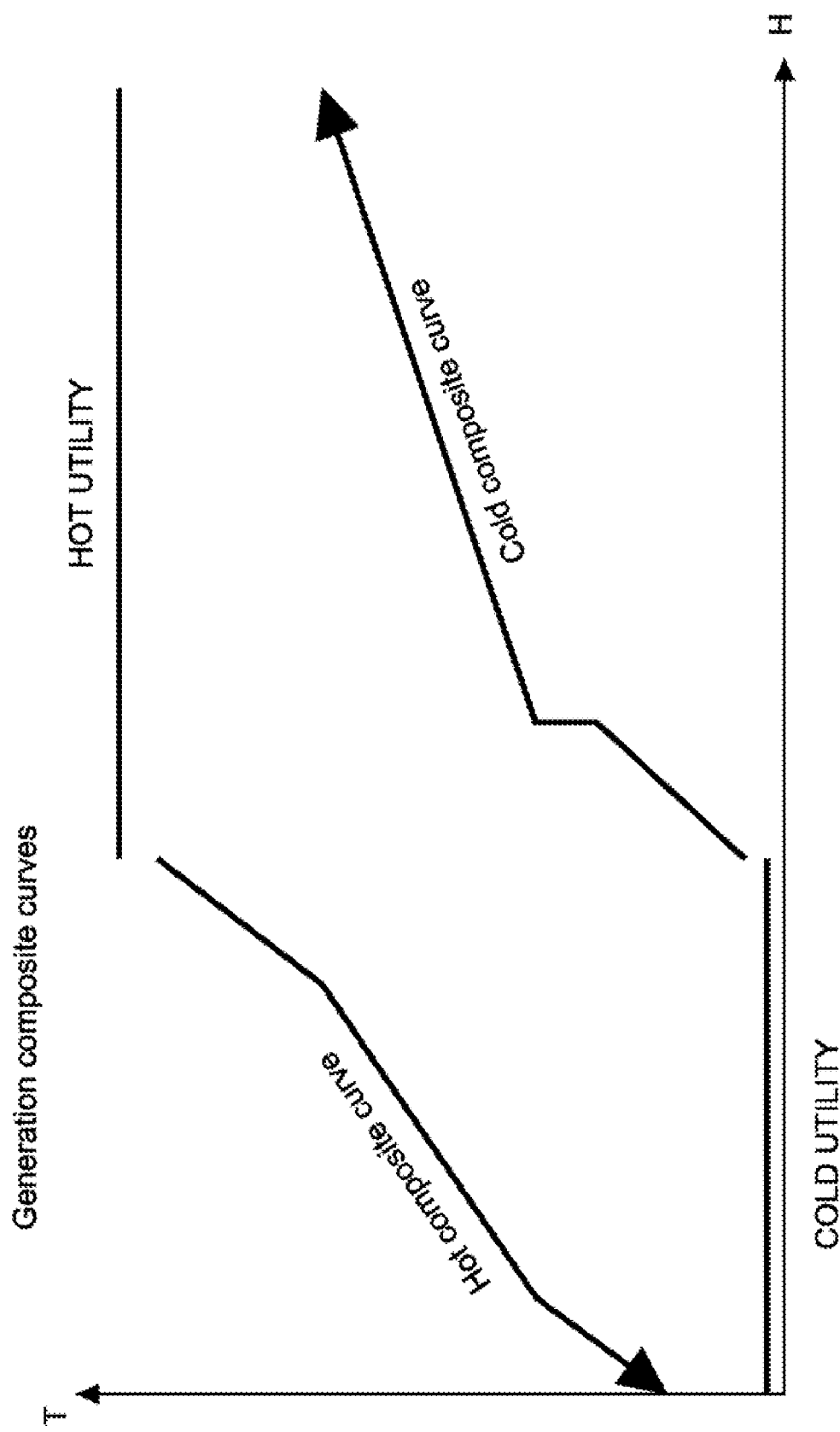
Figure 6:
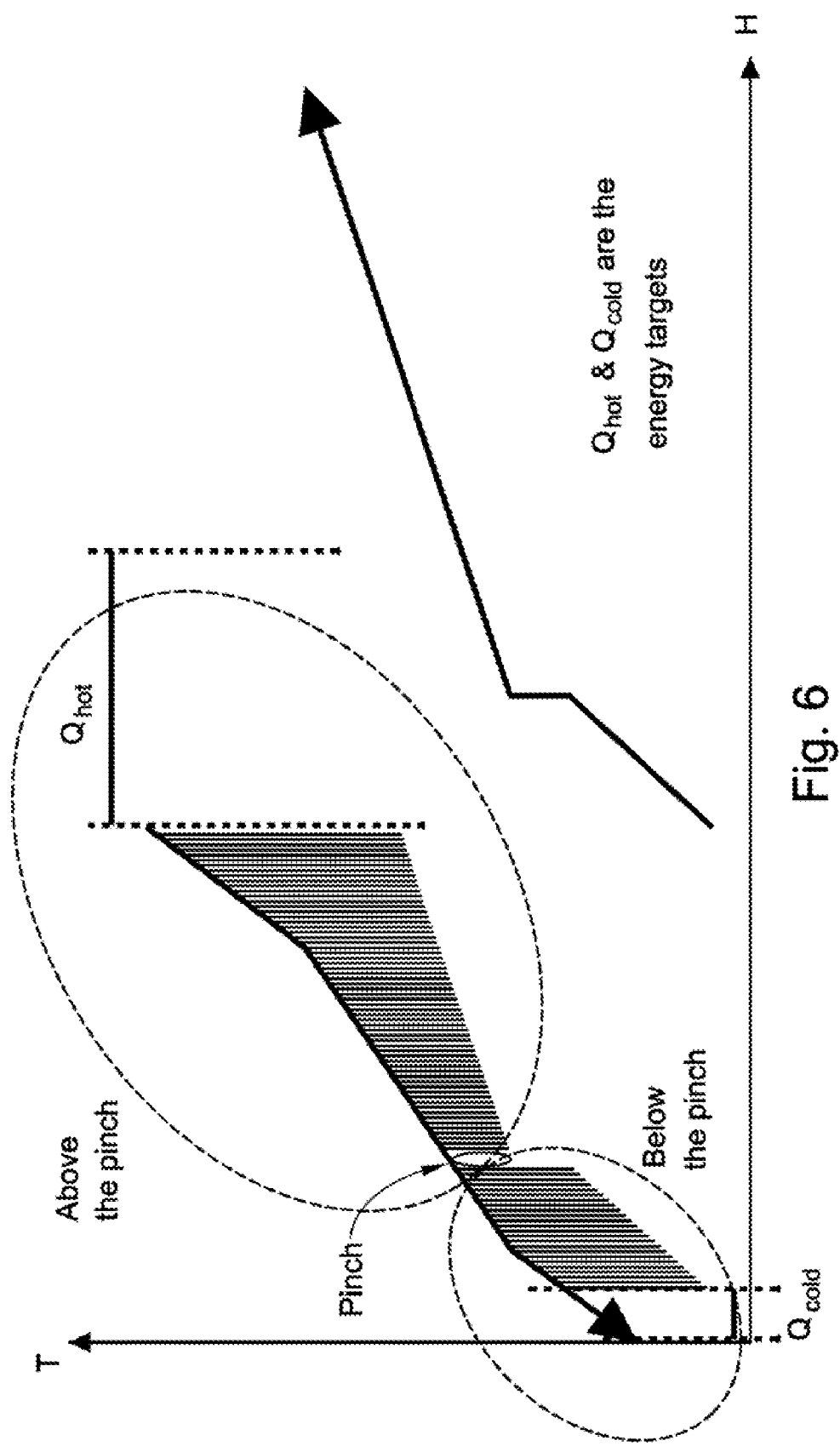

FIG. 2 illustrates a high-level flow diagram illustrating operation of the energy utility modeling program product 51 according to an embodiment of the present invention. As shown in block 101, the program product 51 can receive input data entered by a user or stored in the database 43. The data can include, for example, a lower and an upper boundary value for a supply temperature (Ts) of each of the hot resource streams and each of the cold resource streams, a lower and an upper boundary value for a target temperature (Tt) of each of the hot resource streams and each of the cold resource streams, and/or a lower and an upper boundary value for a heat capacity flow rate (FCp) of each of the hot resource streams and each of the cold resource streams (see, e.g., FIG. 20). The data can also include a set $\{\Delta T_{min}^i [L:U]\}$ of lower and upper stream-specific minimum temperature approach boundary values $\Delta T_{min}^i$ for each the plurality of hot resource streams. Note, in the flow diagram, the "L" refers to low or minimum value of the range or interval and the "U" refers to the high or maximum value of the range or interval.

As shown in block 103, each member of the set $\{\Delta T_{min}^i\}$ of stream-specific minimum temperature approach boundary values can be assigned the lower boundary value $\{\Delta T_{min}^i\} = \Delta T_{min}^i[L]$ As shown in block 105, using the input data and the $\Delta T_{min}^i$ value data, the program product 51 can then calculate the global heating energy utility interval [Qh(minimum), Qh(maximum)] illustrated more simply as Qh [L:U] with the "L" meaning low or minimum value of the interval and the "U" meaning high or maximum value of the interval. The program product 51 can also determine the global cooling energy utility interval [Qc(minimum), Qc(maximum)] illustrated more simply as Qc [L:U]. According to an embodiment of the program product 51, a cascade algorithm, as will be described in more detail later, is used to perform such operation.

As shown in block 107, the program product 51 then selects as its global minimum heating energy utility value Qh the minimum value (Qh(minimum) or simply Qh[L]) of those of the global heating energy utility interval values, along with its corresponding global minimum cooling energy value Qc using, e.g., a collapsing intervals algorithm, described in more detail later, to find the exact process conditions within the received range boundaries that provide such minimums. The program product 51 then calculates an associated energy cost. Similarly, as shown in block 109, the program product 51 also selects as its global minimum cooling energy utility value Qc the minimum value (Qc(minimum) or simply Qc[L]) of those of the global cooling energy utility interval values, along with its corresponding global minimum heating energy value Qh using, e.g., the collapsing intervals algorithm, to find the exact process conditions within the received range boundaries that provide such minimums; and calculates an associated energy cost. As shown in block 111, the program product 51 then selects the minimum energy cost of the two calculated energy costs.

As shown in block 113, using the specific minimum temperature approach $\Delta T_{min}^i$ values providing the process conditions which provide the minimum energy cost, a heat exchanger network (HEN) can then be designed. Further, a capital cost associated with the HEN can be calculated. As shown in block 115, the program product 51 can then use the calculated minimum energy cost along with its associated calculated capital cost to form a single point in a Pareto-optimal chart, such as, for example, that shown in FIG. 21.

As shown in block 117, if the members of the set $\{\Delta T_{min}^i\}$ of stream-specific minimum temperature approach boundary values have not yet been assigned the upper boundary values such that $\{\Delta T_{min}^i\}=\{\Delta T_{min}^i[U]\}$, the analysis continues. If it has been assigned such value, the algorithm passes, or otherwise makes available, the completed Pareto curve to a user such as, for example, a decision maker, as shown in block 119, along with the corresponding definitions of the process conditions/variables, the finished sets of $\{\Delta T_{min}^i\}$, and associated HEN design, as shown in block 121.

As shown in blocks 123 and 125, and as will be described in more detail later, incremental values are marched into $\Delta T_{min}^i$ in order to complete an analysis on the continuum of values. As shown in block 127, similar to block 105, but using the incremented $\Delta T_{min}^i$ value data, the program product 51 then calculates the global heating energy utility interval Qh [L:U] and the global cooling energy utility interval Qc [L:U], using, for example, the cascade algorithm. As shown in block 129, the global minimum heating energy utility value Qh[L], global minimum cooling utility value Qc[L], and set $\{\Delta T_{min}^i\}$ of stream-specific minimum temperature approach values, are then stored in, for example, database 43.

As shown in block 131, if the number "i" of hot streams (i) is not the maximum number, the program product 51 resets the set $\{\Delta T_{min}^i\}$ of stream-specific minimum temperature approach values (block 133) increments the value of "i" and increments $\Delta T_{min}^i$ (block 135) to continue the analysis and storage of datasets. If the number "i" of hot streams (i) is the maximum number, as shown in block 137, the program product 51 chooses the set $\{\Delta T_{min}^i\}$ with the minimum increase in the more expensive global minimum energy utility values Qh[L] or Qc[L]. As shown in block 105, the program product 51 then calculates the global heating energy utility interval Qh [L:U] and the global cooling energy utility interval Qc [L:U] using this chosen set $\{\Delta T_{min}^i\}$.

Additional details describing some of the more important functions of the program product 51, according to an embodiment of the present invention, follow:

FIG. 20 is a screen shot of a graphical user interface for a program product, which illustrates an industrial process that incorporates four separate and distinct resource streams in an embodiment of the present invention. Resource streams H1 and H2 are hot streams, whereas streams C1 and C2 are cold streams. Resources streams H1 and H2, each have their own independent minimum temperature approach with reference to cold streams C1 and C2. In the embodiment shown in FIG. 20, three separate operational attributes for each resource stream are monitored and modeled. The supply temperature of each stream, its target temperature, and a heat capacity flow rate (FCp) for the stream are monitored and shown in FIG. 20. FIG. 20 also illustrates the situation provided when a range of attribute values have been received for each attribute of each resource stream. As this information is entered, the software continuously updates and calculates, under any possible set of minimum temperature difference between the hot and cold resources, values for both the global minimum energy required for cooling and the global minimum energy required for heating by the process employed. It also calculates both the global maximum energy required for cooling and the global maximum energy required for heating by the process employed. Aspects of the present invention have been described by way of example only, and it should be appreciated that modifications and additions may be made thereto without departing from the scope thereof.

As this information is entered, the program product 51 continuously updates and calculates, under any possible minimum temperature difference between the hot and cold resources, values for both the global minimum energy required for cooling and the global minimum energy required for heating by the process (Enthalpy Min). It also calculates both the global maximum energy required for cooling and the global maximum energy required for heating by the process (Enthalpy Max).

In a preferred embodiment, the program product 51 provided is adapted to calculate global minimum energy consumption values required by hot and cold resource streams in any process or cluster of processes under a variable heat transfer driving force distribution, and determine for desired energy consumption targets the optimal process conditions and heat transfer driving force distribution among process streams using, for example, the mathematical formulation described below.

As perhaps best shown in FIG. 10, the hot streams temperatures, received either via automated processes or by direct manual input, are shifted down one-by-one by the first set of desired minimum temperature differences, $\Delta T_{min}^i$, between the hot and cold resource streams to form a set of possible discrete temperature values for a continuum of possible values for $\Delta T_{min}^i$. $\Delta T_{min}^i$ represents the $\Delta T_{min}$ of hot stream (i) which refers to the minimum temperature approach (value) between a specific hot stream and all other cold streams. The first $\Delta T_{min}^i$ can be given a value equal to zero for all hot streams to establish the global theoretical energy targets of the energy system under a theoretical optimum driving force distribution from energy consumption point of view. The second value of $\Delta T_{min}^i$ will be equal to, for example, one degree or some other small value as per the required temperature precision, to obtain the practical energy targets at an optimal driving force distribution from an energy point of view. This can continue until $\Delta T_{min}^i$ reaches an upper boundary. Note, the upper boundary for each hot stream $\Delta T_{min}^i$ should be the stream-specific $\Delta T_{min}^i$ that creates a situation of no possible integration between any specific hot stream and any cold stream, i.e., the difference between the temperature of the hot stream being analyzed and the coolest cold stream.

The shifted supply and target (output) temperatures of resource hot streams, and the actual supply and the target cold streams temperatures obtained above are then sorted in a descending order, with duplicates removed, with each successive temperature pair representing the boundaries of a "TEMPERATURE STEP" and defining anew temperature step "S". Each supply temperature and target temperature input is in the form of intervals (e.g., a pair of range boundaries) and not single discrete numbers.

Figures 8, 9:
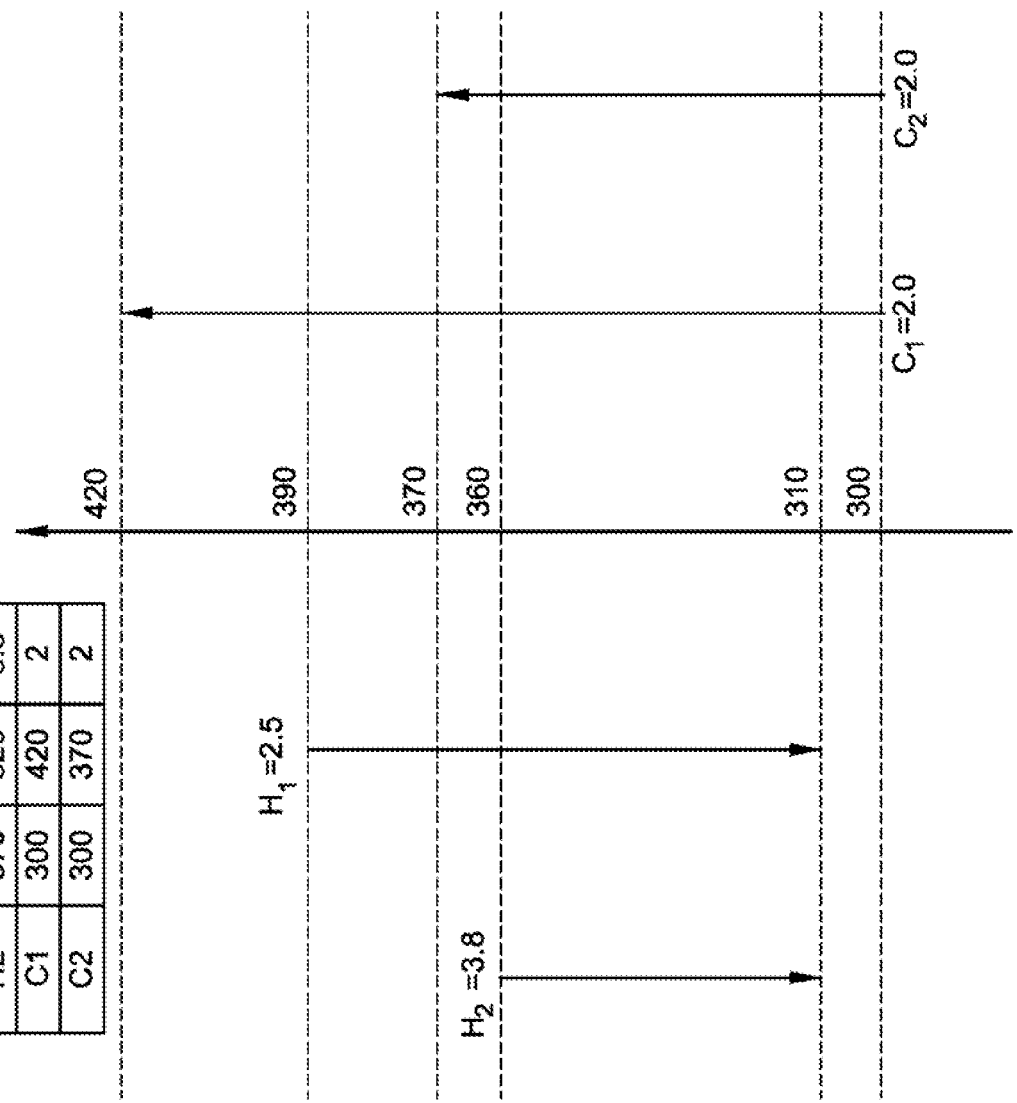
Figure 21:
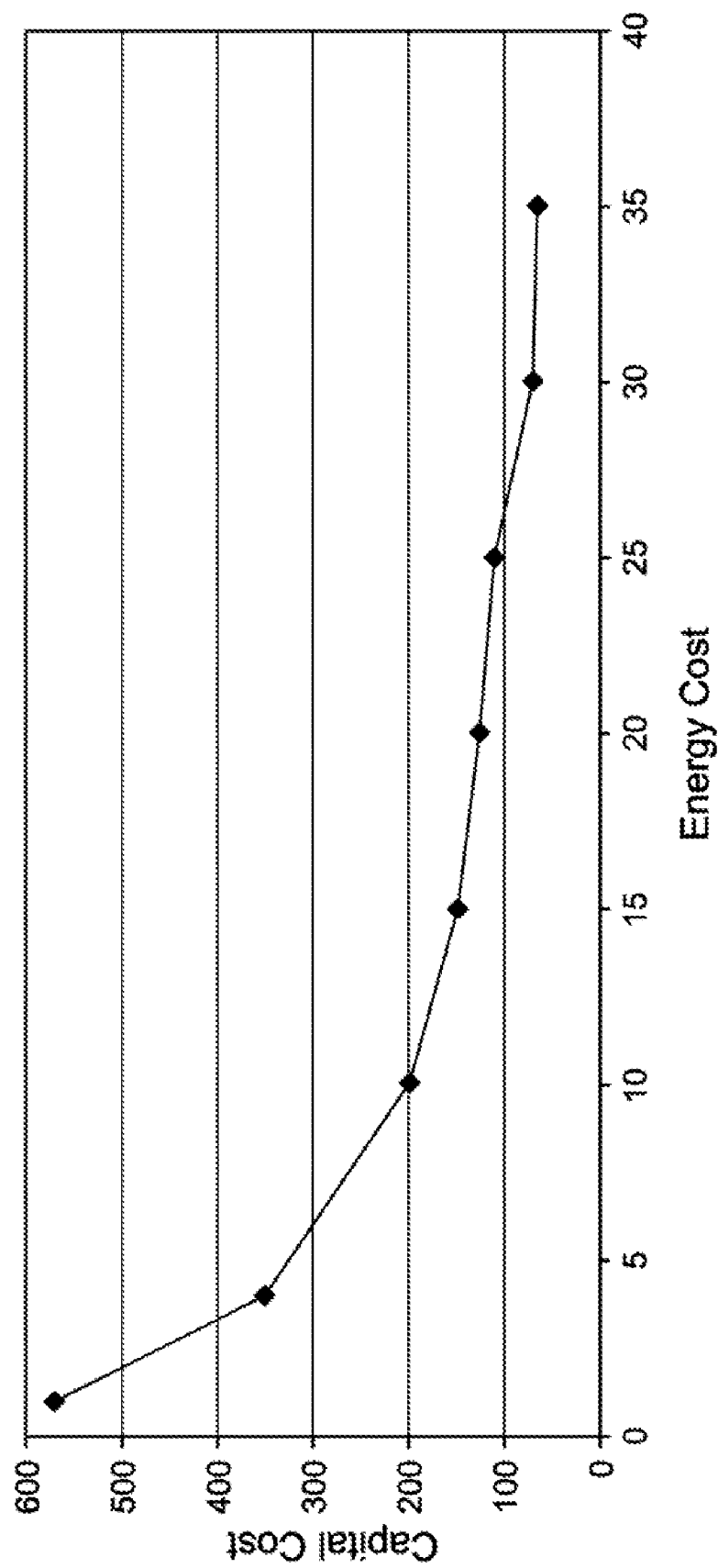
FIG. 21 is a graph illustrating a pareto-curve for the objectives of minimum energy cost and minimum capital cost generated according to an embodiment of the present invention.

Each supply temperature and target temperature input is then divided, for example, on an equal basis according to the desired temperature precision. The completion of this step results in "N" number of process temperature steps. Note, FIGS. 9 and 11 illustrates a basic model showing the "temperature steps" for hot and cold streams having discrete attribute values, FIG. 9 illustrating such steps for an algorithm using a global $\Delta T_{min}$ of 10° K. (see FIG. 7) for a process having two hot resource streams H1 and H2 and two cold resource streams C1 and C2; and FIG. 11 illustrating such steps for the same process, but instead using stream-specific minimum temperature approaches $\Delta T_{min}^{i}$, 5° K. for H1 and 15° K. for H2.

The total number of temperature steps is "N+1," where S varies from 0, 1, 2, . . . , N and the temperature step number "0" represents the external energy utility temperature step. In this step, known as the external energy step, energy output, as will be described below, is assigned two initial values: $Q_{s=0}^{low\_output}=0.0$ in "energy units" and $Q_{s=0}^{high\_output}=0.0$ in "energy units."

Figure 22:
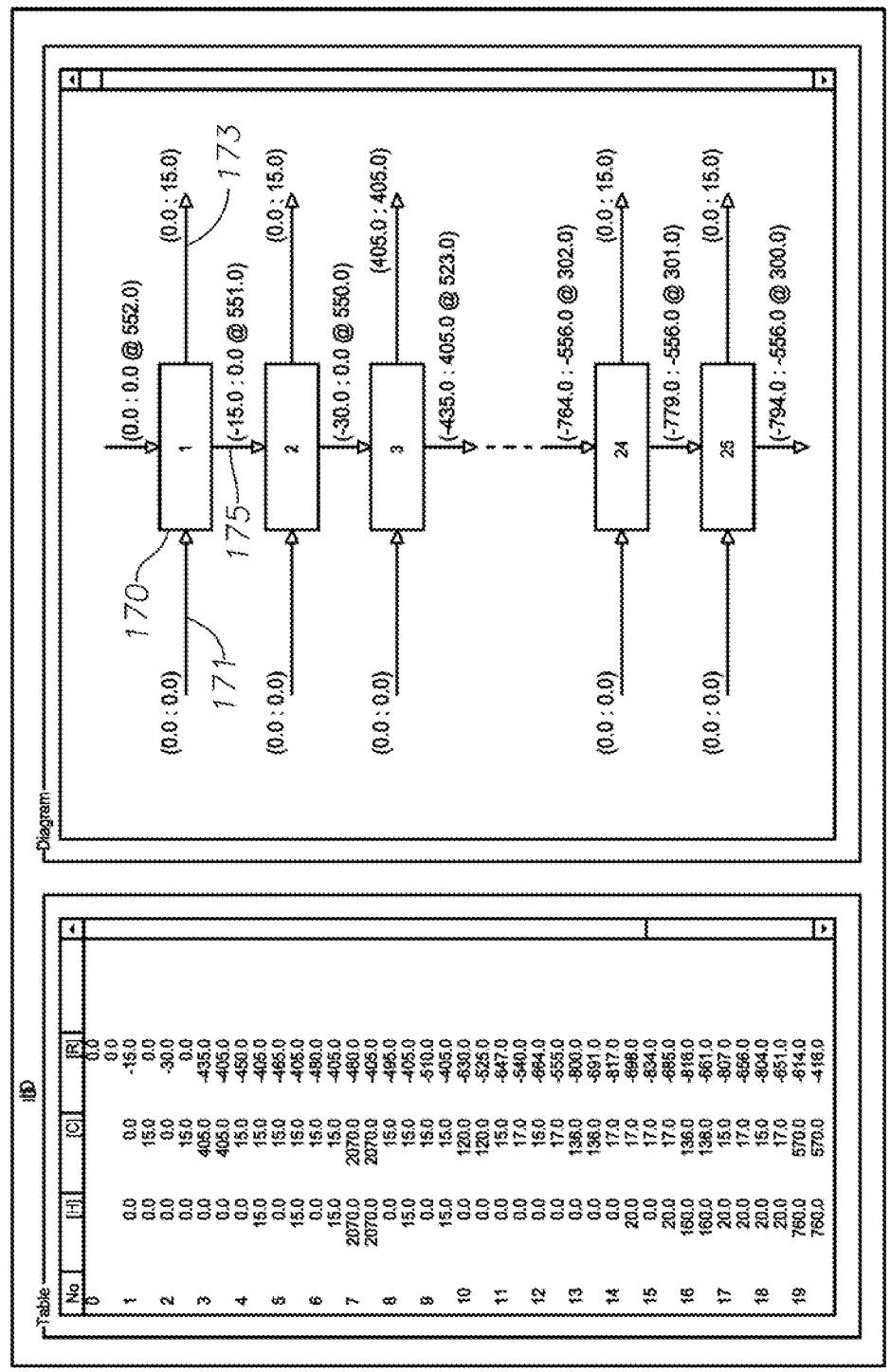
FIG. 22 is a graphical user interface illustrating the temperature steps of the first phase of a cascading algorithm implemented according to embodiments of the present invention.

As perhaps best shown in FIG. 22, according to a cascading algorithm, each temperature step "S" 170 greater than 0, where S=1, 2, . . . , N, has energy surplus $Q_s^{surplus}$. Such energy surplus has two calculated values: $Q_s^{low\_surplus}$ and $Q_s^{high\_surplus}$. It also has energy output $Q_s^{output}$ from one temperature step to another. Such energy output $Q_s^{output}$ has also two calculated values: $Q_s^{low\_output}$ and $Q_s^{high\_output}$. These values for energy surplus $Q_s^{surplus}$ and energy output $Q_s^{output}$ are calculated as follows for S=1, 2, . . . , N:

$$Q_s^{low\_surplus} = \left(\sum_{k=1}^{n_s} FCp_k^{low} - \sum_{j=1}^{m_s} FCp_j^{high}\right)(Th_s - Tc_s),$$

$$Q_s^{high\_surplus} = \left(\sum_{k=1}^{n_s} FCp_k^{high} - \sum_{j=1}^{m_s} FCp_j^{low}\right)(Th_s - Tc_s),$$

$$Q_s^{low\_output} = Q_{s-1}^{low\_output} + Q_s^{low\_Surplus},$$

$$Q_s^{high\_output} = Q_{s-1}^{high\_output} + Q_s^{high\_Surplus},$$

where $n_s$ and $m_s$ are the number of the resource hot and cold streams respectively represented in the $S^{th}$ temperature step and $Th_s$ and $Tc_s$ are the higher and lower shifted temperatures for the hot streams, respectively, and actual temperature of the cold streams representing the temperature boundaries.

$FCp^{low}_k$: is the low value of the Heat Capacity Flowrate term resulted from the multiplication of the value of the flow F lower bound by the specific heat value Cp of the hot stream number k in flow-specific heat units.

$FCp^{high}_k$: is the high value of the Heat Capacity Flowrate term resulted from the multiplication of the value of the flow F upper bound by the specific heat value Cp of the hot stream number k in flow-specific heat units.

$FCp^{low}_j$: is the low value of the Heat Capacity Flowrate term resulted from the multiplication of the value of the flow F lower bound by the specific heat value Cp of the cold stream number j in flow-specific heat units.

$FCp^{high}_j$: is the high value of the Heat Capacity Flowrate term resulted from the multiplication of the value of the flow F upper bound by the specific heat value Cp of the cold stream number j in flow-specific heat units.

The global minimum heating energy utility (Qh) is then calculated as follows:

$$Qh(\text{minimum})=\text{ABS Min}\{\text{Min}[Q_s^{high\_output}],0.0\},$$

where: S=0, 1, 2, . . . , N; and ABS is the absolute of the value between brackets, $$Qh(\text{maximum})=\text{ABS Min}\{\text{Min}[Q_s^{low\_output}],0.0\},$$

and the Qh interval becomes:

Qh=[Qh(minimum), Qh(maximum)], which represents utility, which must be obtained from outside the process.

The global minimum cooling energy utility (Qc) is then calculated using steps similar to that for calculating Qh. First, a set of intervals designated as zQh are calculated as follows:

Calculate ZQh interval $$ZQh(\text{minimum})=\text{ABS Min}\{\text{Min}[Q_s^{high\_output}],0.0\},$$

where S=0, 1, 2, . . . , N;

$$ZQh(\text{maximum})=\text{ABS Min}\{\text{Min}[Q_s^{low\_output}],0.0\},$$

and the ZQh interval becomes:

$$ZQh=[ZQh(\text{minimum}),ZQh(\text{maximum})].$$

Figure 23:
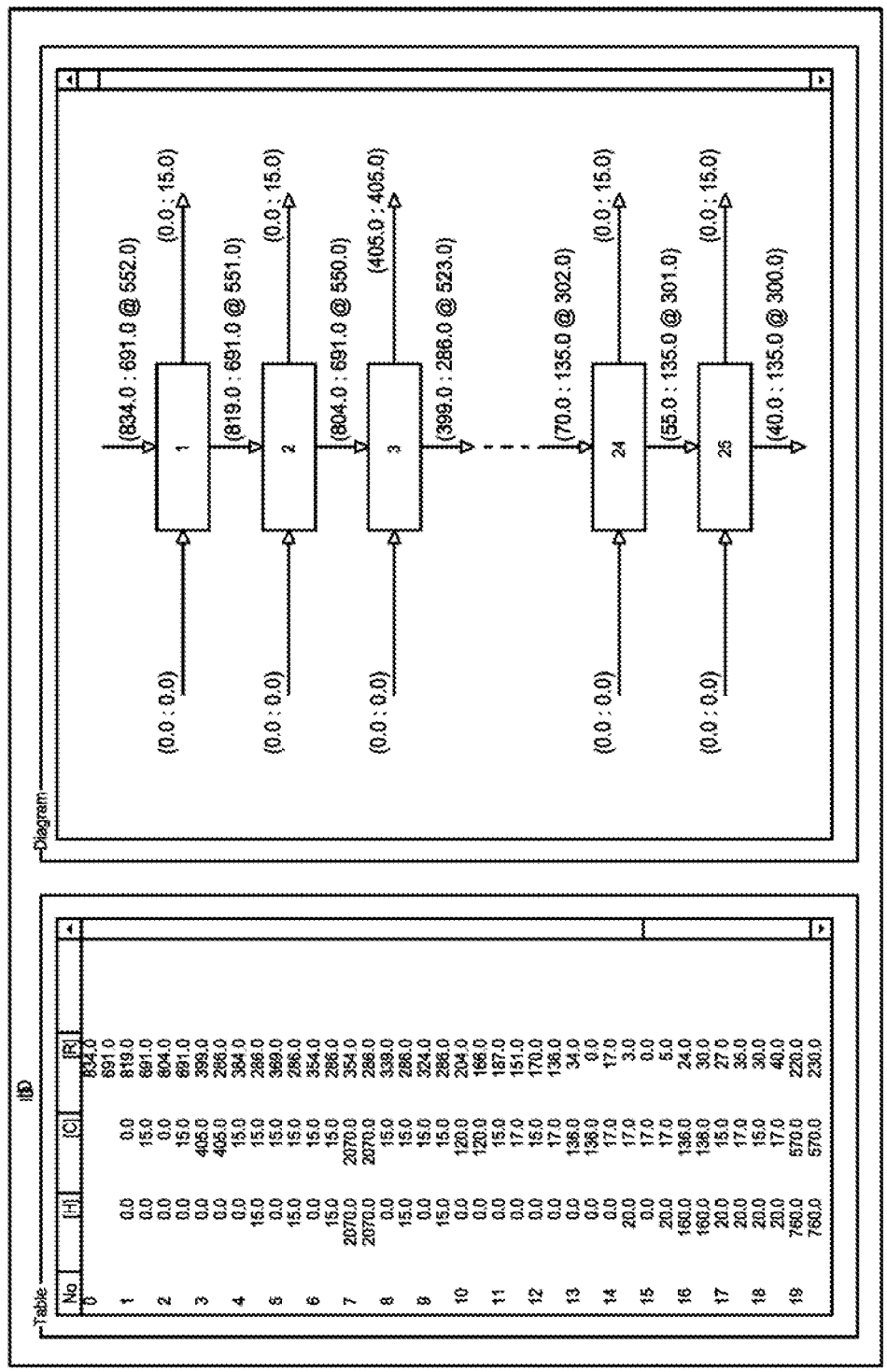
FIG. 23 is a graphical user interface illustrating the temperature steps of the second phase of a cascading algorithm implemented according to embodiments of the present invention.

Next, as perhaps best shown in FIG. 23, according to a cascading algorithm, the calculations used to determine the Qh interval are implemented using, instead, the symmetric image of the above ZQh interval in the temperature step number "zero (0)" to represent the external hot energy utility in temperature step number "zero." This symmetric image of the ZQh interval renders the Qh interval elements, but in different order. That is, if ZQh=[100, 200], this symmetric image would be [200, 100]. Step number "zero," used in solving the Qh(minimum) and Qh(maximum) values for Qh, had two initial energy output values set as follows: $Q_{s=0}^{low\_output}=0.0$ in "energy units" and $Q_{s=0}^{high\_output}=0.0$ in "energy units". For calculating Qc, we set these two initial energy output ($Q_s^{output}$) values initially to be:

$$Q_{s=0}^{low\_output}=ZQh(\text{maximum}), \text{ and}$$

$$Q_{s=0}^{high\_output}=ZQh(\text{minimum}).$$

Then the remaining calculations are repeated for surplus and output values of each temperature step of the cascading algorithm using these two new values instead of the "zero" values (used before), while using the left term of the interval as the Qs(low_output) and the right term of such interval as the Qs(high_output).

Upon completing all temperature intervals calculations, the output of the last interval will be the global minimum cooling utility (Qc(minimum)) and the global maximum cooling utility (Qc(maximum)).

The next steps taken after completing execution of the cascade algorithm, i.e., completing calculations at the minimum and maximum heating and cooling utilities at minimum theoretical and then practical sets of $\Delta T_{min}^{i}$ based upon interval (range boundary) data, includes obtaining economic targets and calculating obtained energy cost and the corresponding heat recovery system capital cost used to draw a "Pareto" optimal graph (FIG. 21) that shows optimal energy operating cost and energy system capital cost for the one or more different driving force distributions, responsive to calculating the minimum and maximum heating and cooling utilities at the practical sets of $\Delta T_{min}^{i}$ values, as described above.

As perhaps best shown in FIG. 2, economic targets are determined, for example, by selecting an optimal set of process conditions and $\Delta T_{min}^i$ by marching in $\Delta T_{min}^i$, for example, one-by-one degree, for each hot stream with its "stream-specific minimum approach temperature," and then using associated economic data to produce the Pareto-optimal for heat recovery system synthesis. The algorithm for analyzing economic data, according to an embodiment of the present invention, is as follows:

(1) Select desired utility as an energy objective;
(2) Collapse the process conditions interval for each specific hot stream being analyzed;
(3) Increase a $\Delta T_{min}^i$ of a specific hot stream by one degree; and
(4) Determine the effect of change on the desired utility target.

Steps (3) and (4), above, are automatically repeated for all hot streams (one at a time) and define the change that results in minimum increase in desired energy consumption cost. The $\Delta T_{min}^i$ that results in such minimum increase is then assigned to be the new stream-specific $\Delta T_{min}^i$ for such hot stream, while other hot streams will continue to keep their old values.

These procedures can be repeated on sets of $\Delta T_{min}^i$, starting from its lower bounds up to its upper bounds, to generate the Pareto-optimal graph.

Operational Conditions Interval Collapsing Algorithm:

To select the optimal set of process condition, the process conditions interval for each specific hot stream being analyzed is collapsed to render individual discrete boundary values while others are still in interval mode, to allow analysis of the specific process conditions of the subject hot stream at, for example, the range boundaries, or at some interim points therebetween, to thereby determine the desired minimum utility consumption cost and exact process conditions that lead to it. The criteria for interval collapsing, for example, is that we select the lower bound or the upper bound of the interval-based operational attribute that render global minimum of a desired energy utility target. Any operational attribute value that does not render the desired energy target will be ignored. The desired energy target can be the global minimum cooling or global minimum heating utilities or it can be the global minimum heating utilities subject to minimum cooling utilities and vice versa.

If both the lower bound value and the upper bound value of stream supply temperature or target temperature are rendering bad values for the specified energy target, i.e., the algorithm does not render the global minimum energy target, the interval-based supply temperature is tested one-by-one to select the optimal supply temperature that renders the desired energy target. The same procedures can be used for the interval-based stream target temperature.

Beneficially, insights obtained from each process application energy target calculation phase can be used to make the processing time of this algorithm consume less than a second of the computer time.

The new set of driving force distributions values and the set values extracted from the collapsed intervals of process conditions can then, for example, be fed into currently available commercial software, such as, for example, "SPRINT" available through the University of Manchester, to design a suitable heat exchanger network and/or select a minimum capital cost heat exchanger network.

It is important to note that while embodiments of the present invention have been described in the context of a fully functional system, those skilled in the art will appreciate that the mechanism of the present invention and/or aspects thereof are capable of being distributed in the form of a computer readable medium in a variety of forms storing a set of instructions for execution on a processor, processors, or the like, and that the present invention applies equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links capable of storing the set of instructions.

Such media can include operating instructions related to both the method steps and the energy utility modeling program product 51, described above. For example, a computer readable medium that is readable by energy utility modeling computer 31 to optimize energy recovery for a process having a plurality of resource streams (H1 ... Hn, C1 ... Cn), can include instructions, that when executed, cause the computer 31 to perform the operation of receiving a plurality of sets of attribute values 161, 163, 165, (see, e.g., FIGS. 19 and 20) each defining a potential range of attribute values for a separate one of a corresponding plurality of hot resource streams (e.g., H1, H2) and a plurality of sets of attribute values 161, 163, 165, each defining a potential range of attribute values for a separate one of a corresponding plurality of cold resource streams (e.g., C1, C2). Particularly, the sets of attribute values 161, 163, 165, can include a lower and an upper boundary value 161 for a supply temperature (Ts) of each of the plurality of hot resource streams and each of the plurality of cold resource streams, a lower and an upper boundary value 163 for a target temperature (Tt) of each of the plurality of hot resource streams and each of the plurality of cold resource streams, and a lower and an upper boundary value 165 for a heat capacity flow rate (FCp) of each of the plurality of hot resource streams and each of the plurality of cold resource streams. The operation can also include receiving a set of lower and upper stream-specific minimum temperature approach boundary values or intervals ($\{\Delta T_{min}^i[L:U]\}$), or specifically assigned stream-specific minimum temperature approach values ($\Delta T_{min}^i$) for each of the plurality of hot resource streams, e.g., 5° K. for H1, 15° K. for H2, etc.

The operations can also include assigning one or more sets of a plurality of stream-specific minimum temperature approach values ($\{\Delta T_{min}^i\}$) to each of the plurality of hot resource streams, with at least two of the values within each set of stream-specific minimum temperature approach values ($\{\Delta T_{min}^i\}$) being different from each other; and determining a global heating energy utility interval (Oh=[Qh(minimum), Qh(maximum)]) and a global cooling energy utility interval (Qc=[Qc(minimum), Qc(maximum)]) responsive to the operations of receiving and assigning.

The operations can also include determining from the plurality of sets of hot resource streams attribute values 161, 163, 165, and from the plurality of sets of cold resource streams attribute values 161, 163, 165, a first set of discrete process conditions that provide the minimum global minimum heating energy utility (Qh(minimum)) which define a first driving force distribution, and determining from the plurality of sets of hot resource streams attribute values 161, 163, 165, and from the plurality of sets of cold resource streams attribute values 161, 163, 165, a second set of discrete process conditions that provide the minimum global minimum cooling energy utility (Qc(minimum)) which define a second driving force distribution.

The operations can further include calculating a first energy cost requirement associated with implementing the first set of process conditions, calculating a second energy cost requirement associated with implementing the second set of process conditions, selecting the set of process conditions from the first and second sets of process conditions that provides a minimum energy cost requirement responsive to determining the first and the second energy cost requirements associated with the first and the second process conditions, designing a heat exchanger network (HEN) responsive to the selected set of process conditions, and determining a capital cost associated with the heat exchanger network.

Also, for example, according to an embodiment of the present invention, provided is a computer readable medium that is readable by the energy utility modeling computer 31 to optimize energy recovery for a process having a plurality of resource streams, which can include instructions, that when executed, cause the computer 31 to perform the operations of receiving a plurality of sets of attribute values 161, 163, 165, (see, e.g., FIGS. 19 and 20) each defining a potential range of attribute values for a separate one of a corresponding plurality of hot resource streams (e.g., H1, H2) and a plurality of sets of attribute values 161, 163, 165, each defining a potential range of attribute values for a separate one of a corresponding plurality of cold resource streams (e.g., C1, C2), and receiving a plurality of sets of values ($\{\Delta T_{min}^i\}$) each defining a potential range of stream-specific minimum approach values for a separate one of the plurality of hot resource streams.

The operations can also include assigning at least one set of stream-specific minimum temperature approach values ($\{\Delta T_{min}^i\} = \{\Delta T_{min}^i[L]\}$ to $\{\Delta T_{min}^i[U]\}$) to each of a plurality of hot resource streams, with at least two of the values within each set being different from each other; determining a global minimum heating energy utility (Qh(minimum) or (Qh=Qh[L])) responsive to the operation of assigning the at least one set of stream-specific minimum temperature approach values ($\{\Delta_{min}^i\}$); and determining a global minimum cooling energy utility (Qc(minimum) or (Qc=Qc[L])) responsive to the operation of assigning the at least one set of stream-specific minimum temperature approach values ($\{\Delta T_{min}^i\}$).

The operation of determining a global minimum heating energy utility (Qh(minimum)) can also include the operation of determining a plurality of temperature step intervals 170 (see, e.g., FIG. 22) for one set of the plurality of stream-specific minimum temperature approaches ($\Delta T_{min}^i$) assigned to the plurality of hot resource streams responsive to the operation of assigning at least one set of stream-specific minimum temperature approach values ($\{\Delta T_{min}^i\}$) to the plurality of hot resource streams; determining a minimum high output value ($Q_s^{high\_output}$) and a minimum low output value ($Q_s^{low\_output}$) of the plurality of temperature step intervals 170; and determining a global heating energy utility interval (Oh=[Qh(minimum), Qh(maximum)]) responsive to the operation of determining the minimum high output value ($Q_s^{high\_output}$) and the minimum low output value ($Q_s^{low\_output}$).

Note, as perhaps best show in FIG. 22, each temperature step interval 170 can have an input interval 171 (e.g., pair of inputs) indicating heat extracted collectively from the plurality of hot resource streams, an output interval 173 ($Q_s^{output} = [Q_s^{low\_output}, Q_s^{high\_output}]$) indicating heat collectively applied to a plurality of cold resource streams, and an output interval 175 ($Q_s^{surplus} = [Q_s^{low\_surplus}, Q_s^{high\_surplus}]$) indicating surplus heat available for a next of the plurality of temperature step intervals. Note also, according to an embodiment of the present invention, the global heating energy utility interval (Qh=[Qh(minimum), Qh(maximum)]) is determined according to the following calculation:

$$Qh = [Qh(\text{minimum}), Qh(\text{maximum})];$$

where:

$$Qh(\text{minimum}) = ABS\,\text{Min}\{\text{Min}[Q_s^{high\_output}], 0.0\};$$

$$Qh(\text{maximum}) = ABS\,\text{Min}\{\text{Min}[Q_s^{low\_output}], 0.0\};$$

where:

$$Q_s^{low\_output} = Q_{s-1}^{low\_output} + Q_s^{low\_Surplus};$$

$$Q_s^{high\_output} = Q_{s-1}^{high\_output} + Q_s^{high\_Surplus};$$

where:

$$Q_s^{low\_surplus} = \left(\sum_{k=1}^{n_s} FCp_k^{low} - \sum_{j=1}^{m_s} FCp_j^{high}\right)(Th_s - Tc_s); \text{ and}$$

$$Q_s^{high\_surplus} = \left(\sum_{k=1}^{n_s} FCp_k^{high} - \sum_{j=1}^{m_s} FCp_j^{low}\right)(Th_s - Tc_s).$$

Also, according to an embodiment of the present invention, the plurality of hot resource streams can be assigned a plurality of sets of values ($\{\Delta T_{min}^i[L:U]\}$) each separately defining a potential range of stream-specific minimum approach values ($\Delta T_{min}^i$) for each of the plurality of hot resource streams. The first value for the set of specific minimum temperature approaches ($\{\Delta T_{min}^i[L:U]\}$) utilized in the above calculations was the lowest range value ($\Delta T_{min}^i[L]$) of each value range within the set of the plurality of stream-specific minimum approach values ($\{\Delta T_{min}^i[L:U]\}$) assigned to each of the plurality of hot resource streams. Accordingly, the operations also include iteratively performing the operations of determining a plurality of temperature step intervals 170, determining a minimum high output value ($Q_s^{high\_output}$) and a minimum low output value ($Q_s^{low\_output}$), and determining a global heating energy utility interval (Qh=[Qc(minimum), Qh(maximum)]), for each of the remaining received plurality of specific minimum temperature approach values ($\Delta T_{min}^i$).

According to this embodiment of the computer readable medium, similar to that of determining the global minimum heating energy utility (Qh(minimum)), the operation of determining a global minimum cooling energy utility (Qc(minimum)) can include the operation of determining a global cooling energy utility interval ([Qc(minimum), Qc(maximum)]) which can further include the operations of first determining a symmetric image ([Qh(maximum), Qh(minimum)]) of a global heating energy utility interval ([Qh(minimum), Qh(maximum)]), and determining a plurality of temperature step intervals 170 for one set of the plurality of stream-specific minimum temperature approaches $\{\Delta T_{min}^i\}$ assigned to the plurality of hot resource streams responsive to the operation of determining the symmetric image ([Qh(maximum), Qh(minimum)]) which provides the initial input (see, e.g., FIG. 23) for determining ([Qc(minimum), Qc(maximum)]) using the same cascading algorithm, described previously.

The operations can also include determining a minimum high output value ($Q_s^{high\_output}$) and a minimum low output value ($Q_s^{low\_output}$) of each of the plurality of temperature step intervals 170, and determining the global cooling energy utility interval (Qc=[Qc(minimum), Qc(maximum)]) responsive to the determining of the minimum high output value ($Q_s^{high\_output}$) and the minimum low output value ($Q_s^{low-}$ $^{output}$). The sub-operations of determining a plurality of temperature step intervals 170, determining a minimum high output value ($Q_s^{high\_output}$) and a minimum low output value ($Q_s^{low\_output}$), and determining a global cooling energy utility interval (Qc=[Qc(minimum), Qc(maximum)]), are then performed for each of the remaining plurality of specific minimum temperature approach values within the set $\{\Delta T_{min}^i\}$.

The operations can also further include determining from the plurality of sets of hot and cold resource streams attribute values 161, 163, 165, a first set of discrete process conditions that provide the minimum global minimum heating energy utility (Qh(minimum)) defining a first driving force distribution; and determining from the plurality of sets of hot and cold resource streams attribute values 161, 163, 165, a second set of discrete process conditions that provide the minimum global minimum cooling energy utility (Qc(minimum)) defining a second driving force distribution. The operations can further include calculating a first energy cost requirement associated with implementing the first set of process conditions, calculating a second energy cost requirement associated with implementing the second set of process conditions, selecting the set of process conditions from the first and second sets of process conditions that provides a minimum energy cost requirement responsive to determining the first and the second energy cost requirements associated with the first and the second process conditions, designing or otherwise providing instructions to design a heat exchanger network responsive to the selected set of process conditions, and determining a capital cost associated with the heat exchanger network.

The operations can also include iteratively/incrementally determining first and second sets of discrete process conditions, calculating first and second energy cost requirements associated therewith, and selecting the set of process conditions providing the minimum energy cost requirement, for each of a plurality of combinations of stream-specific minimum approach values ($\Delta T_{min}^i$) falling within the potential range of stream-specific minimum approach values for each one of the plurality of hot resource streams, to thereby draw a capital versus energy cost Pareto optimal chart (see, e.g., FIG. 21) used for determining an appropriate heat exchanger network based on a trade-off between capital cost and energy cost, and for providing a decision-maker expected utility purchasing requirements based on that selection.

The various embodiments of the present invention include numerous advantages and benefits. In a preferred embodiment, the program product 51 provided may also be adapted to indicate optimal cost settings or values of particular operational attributes which, when used, result in the optimal energy consumption total cost value calculated. These particular settings or values for operational attributes may then be used in the implementation of the actual process after modeling has occurred to potentially optimize the process.

Preferably the program product 51 provided can be adapted to model the energy consumption of a particular process. In general terms, the modeling operation or facility provided can be used in investigations or analyses of specific processes and their energy consumption characteristics or requirements. In a further preferred embodiment, the model or modeling facility provided may be used to optimize the energy consumption characteristics of a process, preferably to minimize the amount of energy consumed. Reference throughout this specification was also made to embodiments of the present invention being used as a tool to optimize the energy consumption of a process, but those skilled in the art should appreciate that embodiments of the present invention may also be used as a simple analytical or analysis tool, if required.

Furthermore, a process as referred to throughout this specification may be defined as any operation or set of operations which consumes energy to in turn produce a required result, or alternatively to produce a material or product. Processes can range, for example, from the domestic with the use of household hot water system to heat, cool or mechanically process or chop materials, to the industrial, to include electricity generation systems and plant as examples.

Processes that have their associated energy consumption modeled in conjunction with embodiments the present invention, may also include manufacturing plant, equipment or manufacturing production lines, or collections of production lines which may produce unrelated products or materials. Furthermore, a single process to be considered in conjunction with embodiments of the present invention may also consist of or incorporate a set of sub-processes which need not necessarily be related together, nor in some instances, need not require the physical apparatus or equipment employed to be located in close proximity or adjacent to other equipment used.

Reference throughout this specification was, however, made to a process modeled in conjunction with embodiments of the present invention being a single manufacturing production line for a specific type of product. However, those skilled in the art should appreciate that these references are made for the sake of simplicity only and the embodiments of the present invention may be applied to a wide range and number of different types of varied process, as discussed above.

Embodiments of the present invention may also be adapted to model energy consumption of a single process. The energy consumed may be in a variety of different forms of mechanical and thermal energy. However, for the sake of simplicity, reference throughout this specification will be made to the energy consumed being originally sourced from thermal energy. Again, those skilled in the art should appreciate that other types of energy may also be monitored or modeled in conjunction with the present invention and reference to the above only throughout this specification should in no way be seen as limiting.

In addition, the energy consumed in conjunction with embodiments of the present invention were, in general terms, referred to as being employed to heat or cool materials. Again, however, those skilled in the art should appreciate that other energy consumption applications may also be considered in conjunction with the embodiments of the present invention and reference to the above only should in no way be seen as limiting.

Preferably a process modeled in accordance with embodiments of the present invention may include a plurality of resource streams. In general terms, a resource stream may consist of a flow of material that is consumed, modified or employed in some way within the process. For example, resource streams may consist of flows of water or other types of fluid or gases, or alternatively two or three phase flows. Pressure as a state variable can be handled the same way energy and mass quantities are handled.

Reference throughout this specification was also made to the resource streams monitored using embodiments of the present invention and employed in the particular process modeled to include flows of one or more types of fluid. However, those skilled in the art should appreciate that other types of resources may also be employed and modeled in conjunction with embodiments of the present invention and reference to the above only throughout this specification should in no way be seen as limiting. Furthermore, those skilled in the art should also appreciate that a resource stream need not necessarily be made up of a substantially continuous flow of material. For example, in some instances a resource stream may be composed from a supply or flow or material delivered periodically in discreet blocks, if required.

In a preferred embodiment of the present invention, a resource stream may have at least one operational attribute associated with it. An operational and/or design attribute may be a specific characteristic or parameter associated with a particular stream which in turn will have an effect on the energy consumed by the process modeled. Those skilled in the art should appreciate that various different types of operational attributes may be monitored and modeled in conjunction with the embodiments of the present invention, depending on the particular type of resource stream which the operational attribute is associated with. For example, in some instances, examples of operational attributes could include a materials temperature, flow rate, composition, pressure, latent heat of vaporization, latent heat of condensation, latent heat of sublimation, and/or combinations of all these attributes.

For the sake of simplicity and in general terms, reference throughout this specification was made to the operational attributes monitored and modeled being the temperature of a fluid flow, the flow rate, and the specific heat of the resource stream of a fluid flow. Again however, those skilled in the art should appreciate that other configurations and implementations of the present invention are envisioned and reference to the above only throughout this specification should in no way be seen as limiting.

In a preferred embodiment of the present invention, the program product employed can record, hold or otherwise receive a list of identified resource streams within a process that affect the energy consumption of the process. Preferably all the resource streams involved may be monitored and modeled in conjunction with the embodiments of the present invention to provide the most accurate indication or calculation of the energy consumption value or values required.

In alternative embodiments of the present invention, it is not necessary to identify and monitor all resource streams employed in a process. For example, in such an alternative embodiment, only a selected number of streams, which are of the most importance or have the most significance with respect to energy consumption of the process, may be monitored or identified. This can provide an approximate calculation of the energy consumption value or values required while using relatively low cost computer systems or to provide a fast approximate indication of an energy consumption value.

In a preferred embodiment of the present invention, all relevant operational and/or design attributes of the resource streams monitored or modeled may in turn be identified for or within the program product employed. Preferably all operational and/or design attributes of the streams monitored which have an effect on the energy consumption of a process may be tracked and modeled in conjunction with a preferred embodiment of the present invention. Modeling each and every operational and design attribute which affects energy consumption will in turn provide an accurate calculation of energy consumption for the process modeled.

In alternative embodiments of the present invention, each and every relevant operational and/or design attribute may not necessarily be monitored or modeled. For example, in one alternative embodiment, only a selected number of highly relevant or highly significant attributes with respect to energy consumption may be monitored or modeled in conjunction with the present invention. This program product allows the rigorous check of such significance because of its interactive data entry capability that enables the calculation of the energy consumption global minima and maxima upon the entry of the data of each resource stream. This approach can allow a fast and approximate energy consumption values to be calculated or alternatively allow the present invention to function using a relatively low capacity computer system or systems.

In a preferred embodiment of the present invention, the program product provided is adapted to receive at least one set of a range of attribute values from a user. The user of the program product may be a person, persons or organization wishing to model and potentially optimize the energy consumption of a particular process. The user involved can input at least one set of a range of attribute values for a selected operational or design attribute of a resource stream to in turn provide the base data or information required to set up a model of the process involved.

In a preferred embodiment of the present invention, at least one set of a range of attribute values may be received for one or more operational attributes of a resource stream. This information can be indicative of an allowable range of values for a particular operational and/or design attribute that can vary the energy consumed by the process involved. Beneficially, by supplying a range of attribute values, this substantially simplifies the use of the program product provided for a user, who need not experiment with each and every potential case provided through all the discreet single values capable of being entered and received.

In a further preferred embodiment of the present invention, a single set of a range of attribute values may be received from a user and assigned to each and every operational and design attribute identified for each and every resource stream monitored and modeled in conjunction with the present invention. The range of attribute values provided can give the operational and design parameters within which each of the operational attributes can vary or fluctuate in the running of a process to be modeled as well as stream-specific minimum approach temperatures.

However, in alternative embodiments of the present invention, a single range of attribute values need not necessarily be received for any each and every operational and/or design attribute monitored and modeled in conjunction with the present invention. For example, in some alternative embodiments, a single range of operational or design attributes may be provided for a single operational or design attribute for a resource stream that has multiple attributes, as should be appreciated by those skilled in the art. Furthermore, it should also be appreciated that more than one set of ranges of attribute values may be received in relation to a single operational attribute. Several sets of continuous ranges of attribute values may be received, if required, in accordance with such an embodiment.

Reference throughout this specification was, however, made to the program product employed receiving a single set of a range of attribute values for each and every attribute of each and every resource stream monitored and modeled in conjunction with the present invention. However, those skilled in the art should appreciate that other configurations and implementations of the program product to be provided are envisioned and reference to the above only throughout this specification should in no way be seen as limiting.

In a preferred embodiment of the present invention, the program product provided is adapted to calculate at least one energy consumption value using the received range or ranges of attribute values. Preferably the energy consumption value or values calculated may be an optimal value for the process involved, calculated through determining or selecting a specific collection of attribute values, which result in an optimized energy consumption result.

In a further preferred embodiment of the present invention, the program product employed may calculate the global minimum energy consumed by a process or a specifically optimized set of operational and/or design attribute values or settings. This calculation may then be used to fine tune the operation or design of equipment to be employed to implement the process or alternatively to adjust or assist in redesign and redevelopment or refitting work to be completed with respect to existing process system.

In a further preferred embodiment of the present invention, the program product employed may be used to calculate a value for $Q_h$, being the global energy utility employed to heat resource streams, and $Q_c$, being the global energy utility used to cool resource streams. It can also be used to calculate minimum heating utility subject to global minimum cooling utility and the minimum cooling utility subject to global minimum heating utility.

In a preferred embodiment of the present invention, the program product provided is adapted to calculate global minima energy consumption values required by hot and cold resource streams in any process or cluster of processes using unique mathematical formulation.

Those skilled in the art should appreciate that other implementations or aspects of the technology developed are also envisioned and reference to the above only throughout this specification should in no way be seen as limiting. Hence the invention is the methodology, the mathematical algorithm and the user-friendly program product that automatically execute the methodology. The calculation engine/mathematical algorithm in the program product is also another component of the invention since it can be utilized by others to develop their own program product.

This application is related to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topoloy for Future Retrofit"; U.S. patent application Ser. No. 12/575,743, filed Oct. 8, 2009, titled "System, Method, and Program Product for Targeting and Identification of Optimal Process Variables in Constrained Energy Recovery Systems," now U.S. Pat. No. 7,729,809; and is a continuation of U.S. patent application Ser. No. 11/768,084, filed on Jun. 25, 2007, titled "System, Method, and Program Product for Targeting and Optimal Driving Force Distribution in Energy Recovery Systems," now U.S. Pat. No. 7,698,022, which claims priority to U.S. Provisional Patent Application No. 60/816,234, filed Jun. 23, 2006, titled "Method and Program Product for Targeting and Optimal Driving Force Distribution in Energy Recovery Systems," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. This invention is not to be construed as limited to the particular forms or embodiments disclosed, since these are regarded as illustrative rather than restrictive. It will be apparent, however, that various modifications and changes can be made within the spirit and scope of the invention as described in the foregoing specification. For example, in the exemplary embodiment, many points of the heat exchange analysis related to $\Delta T_{min}^i$ focused on hot resource streams with respect to cold resource streams. Alternatively, the heat exchange analysis could be directed to cold resource streams with respect to hot resource streams, and still be within the scope of the present invention.

That claimed is:

1. A system to optimize energy recovery for a process or cluster of processes having a plurality of resource streams, the system comprising:
    an energy utility modeling computer having a processor, and memory coupled to the processor to store software and database records therein; and
    energy utility modeling program product stored in the memory of the energy utility modeling computer to optimize energy recovery for the process, the program product including instructions that when executed by the energy utility modeling computer, cause the computer to perform the operations of:
        assigning each of a plurality of different combinations of stream-specific minimum temperature approach values to a same plurality of process streams, a substantial subset of the plurality of different combinations of stream-specific minimum temperature approach values each including at least one stream-specific minimum temperature approach value being different from at least one other of the stream-specific minimum temperature approach values within the respective combination of stream-specific minimum temperature approach values,
        determining at least one global minimum energy utility consumption value for each combination of the plurality of different combinations of the stream-specific minimum temperature approach values assigned the plurality of process streams to thereby identify an optimal combination of stream-specific minimum temperature approach values assigned the plurality of process streams that render an optimal global minimum energy utility value, and
        responsive to the operation of determining, identifying the optimal combination of stream-specific minimum temperature approach values rendering the optimal global minimum energy utility value.

2. A system as defined in claim 1, wherein the operations further comprise performing at least one of the following:
    determining a global minimum heating energy utility value rendered by the optimal combination of stream-specific minimum temperature approach values; and
    determining a global minimum cooling energy utility value rendered by the optimal combination of stream-specific minimum temperature approach values.

3. A system as defined in claim 1,
    wherein the optimal combination of stream-specific minimum temperature approach values is a first set of stream-specific minimum temperature approach values of one of the plurality of combinations of stream-specific minimum temperature approach values assigned the plurality of process streams that renders the global minimum heating energy utility value; and
    wherein the operations further comprise: identifying a second set of stream-specific minimum temperature approach values of another one of the plurality of combinations of stream-specific minimum temperature approach values assigned the plurality of process streams that renders the global minimum cooling energy utility value.

4. A system as defined in claim 3, wherein the operations further comprise:
    determining a first set of discrete process conditions that renders the global minimum heating energy utility defining a first driving force distribution;

determining a second set of discrete process conditions that renders the global minimum cooling energy utility defining a second driving force distribution; and calculating a first energy utility cost requirement associated with implementing the first set of process conditions and a second energy utility cost requirement associated with implementing the second set of process conditions, to thereby facilitate determining the optimal set of process conditions that provides a minimum total energy utility cost requirement.

5. A system as defined in claim 4, wherein the operations further comprise:

designing a heat exchanger network responsive to the determined optimal set of process conditions and one or both of the first and the second sets of stream-specific minimum temperature approach values; and determining a capital cost associated with the heat exchanger network.

6. A system as defined in claim 1, wherein the operation of determining at least one global energy utility consumption value comprises: iteratively determining a separate global minimum heating energy utility value and a separate global minimum cooling energy utility value for each combination of the plurality of different combinations of the stream-specific minimum temperature approach values assigned the plurality of process streams; and wherein the operations further comprise, for each subset of a plurality of subsets of the plurality of combinations of stream-specific minimum temperature approach values, the operation of: selecting a set of minimum temperature approach values from within the respective subset that renders a minimum increase in a more expensive global minimum energy utility value of the global minimum heating energy and the global minimum cooling energy values associated therewith over that of a prior selected set of minimum temperature approach values of a prior analyzed subset of the plurality of subsets of the plurality of combinations of stream-specific minimum temperature approach values.

7. A system as defined in claim 6, wherein the operations further comprise:

producing a capital versus energy cost Pareto-optimal chart providing indicia of a trade-off between capital cost and energy cost to thereby facilitate selection of an appropriate heat exchanger network, the Pareto-optimal chart comprising data points for at least one global minimum energy utility value for each of the plurality of different combinations of the stream-specific minimum temperature approach values assigned the plurality of process streams; and providing expected utility purchasing requirements and capital costs associated with the selected heat exchanger network.

8. A system as defined in claim 1, wherein the operations of determining at least one global minimum energy utility consumption value for each combination of the plurality of different combinations of the stream-specific minimum temperature approach values and identifying the optimal combination of stream-specific minimum temperature approach values rendering the optimal global minimum energy utility value, comprise:

incrementally increasing a stream-specific minimum temperature approach value of a specific hot process stream of the plurality of process streams by a preselected temperature interval;

determining an effect on a desired utility target responsive to the incremental increase; and repeating the operations of incrementally increasing the stream-specific minimum temperature approach value and determining an effect on the desired utility target, for each other of the hot process streams of the plurality of process streams.

9. A system as defined in claim 1, wherein the plurality of process streams is a plurality of hot process streams, and wherein the operation of assigning a plurality of different combinations of stream-specific minimum temperature approach values comprises: iteratively assigning each minimum temperature approach value of a set of stream-specific minimum temperature approach values to each separate one of the plurality of hot process streams to thereby form the plurality of different combinations of stream-specific minimum temperature approach values, the set of stream-specific minimum temperature approach values comprising at least two minimum temperature approach values being different from each other.

10. A system as defined in claim 1, wherein the plurality of process streams is a plurality of hot process streams, and wherein the operation of assigning a plurality of different combinations of stream-specific minimum temperature approach values comprises: associating each stream-specific set of minimum temperature approach values of a plurality of stream-specific sets of minimum temperature approach values with a different one of the plurality of hot process streams, and for each one of the plurality of hot process streams, iteratively assigning each minimum temperature approach value of the respective associated stream-specific set of minimum temperature approach values to the respective one of the plurality of hot process streams to thereby form the plurality of different combinations of stream-specific minimum temperature approach values, each set of minimum temperature approach values of the plurality of stream-specific sets of minimum temperature approach values including at least two minimum temperature approach values being different from each other, and at least one set of minimum temperature approach values of the plurality of stream-specific sets of minimum temperature approach values having at least one minimum temperature approach value different from each minimum temperature approach value for at least one other set of minimum temperature approach values of the plurality of stream-specific sets of minimum temperature approach values.

11. Program product to optimize energy recovery for a process or cluster of processes having a plurality of resource streams, the program product stored in a tangible computer medium and including instructions that when executed by a computer, cause the computer to perform the operations of:

assigning each of a plurality of different combinations of stream-specific minimum temperature approach values to a same plurality of process streams, a substantial subset of the plurality of different combinations of stream-specific minimum temperature approach values each including at least one stream-specific minimum temperature approach value being different from at least one other of the stream-specific minimum temperature approach values Within the respective combination of stream-specific minimum temperature approach values;

determining at least one global minimum energy utility consumption value for each combination of the plurality of different combinations of the stream-specific minimum temperature approach values assigned the plurality of process streams to thereby identify an optimal combination of stream-specific minimum temperature approach values assigned the plurality of process streams that render an optimal global minimum energy utility value; and identifying the optimal combination of stream-specific minimum temperature approach values rendering the optimal global minimum energy utility value.

12. Program product as defined in claim 11, wherein the operations further comprise performing at least one of the following:

determining a global minimum heating energy utility value rendered by the optimal combination of stream-specific minimum temperature approach values; and determining a global minimum cooling energy utility value rendered by the optimal combination of stream-specific minimum temperature approach values.

13. Program product as defined in claim 11, wherein the optimal combination of stream-specific minimum temperature approach values is a first set of stream-specific minimum temperature approach values of one of the plurality of combinations of stream-specific minimum temperature approach values assigned the plurality of process streams that renders a global minimum heating energy utility value; and wherein the operations further comprise: identifying a second set of stream-specific minimum temperature approach values of another one of the plurality of combinations of stream-specific minimum temperature approach values assigned the plurality of process streams that renders a global minimum cooling energy utility value.

14. Program product as defined in claim 13, wherein the operations further comprise:

determining a first set of discrete process conditions that renders the global minimum heating energy utility defining a first driving force distribution;

determining a second set of discrete process conditions that renders the global minimum cooling energy utility defining a second driving force distribution; and calculating a first energy utility cost requirement associated with implementing the first set of process conditions and a second energy utility cost requirement associated with implementing the second set of process conditions, to thereby facilitate determining the optimal set of process conditions that provides a minimum total energy utility cost requirement.

15. Program product as defined in claim 14, wherein the operations further comprise:

designing a heat exchanger network responsive to the determined optimal set of process conditions and one or both of the first and the second sets of stream-specific minimum temperature approach values; and determining a capital cost associated with the heat exchanger network.

16. Program product as defined in claim 11, wherein the operation of determining at least one global energy utility consumption value comprises: iteratively determining a separate global minimum heating energy utility value and a separate global minimum cooling energy utility value for each combination of the plurality of different combinations of the stream-specific minimum temperature approach values assigned the plurality of process streams; and wherein the operations further comprise, for each subset of a plurality of subsets of the plurality of combinations of stream-specific minimum temperature approach values, the operation of: selecting a set of minimum temperature approach values from within the respective subset that renders a minimum increase in a more expensive global minimum energy utility value of the global minimum heating energy and the global minimum cooling energy values associated therewith over that of a prior selected set of minimum temperature approach values of a prior analyzed subset of the plurality of subsets of the plurality of combinations of stream-specific minimum temperature approach values.

17. Program product as defined in claim 16, wherein the operations further comprise:

producing a capital versus energy cost Pareto-optimal chart providing indicia of a trade-off between capital cost and energy cost to thereby facilitate selection of an appropriate heat exchanger network, the Pareto-optimal chart comprising data points for at least one global minimum energy utility value for each of the plurality of different combinations of the stream-specific minimum temperature approach values assigned the plurality of process streams; and providing expected utility purchasing requirements and capital costs associated with the selected heat exchanger network.

18. Program product as defined in claim 11, wherein the operations of determining at least one global minimum energy utility consumption value for each combination of the plurality of different combinations of the stream-specific minimum temperature approach values and identifying the optimal combination of stream-specific minimum temperature approach values rendering the optimal global minimum energy utility value, comprise:

incrementally increasing a stream-specific minimum temperature approach value of a specific hot process stream of the plurality of process streams by a preselected temperature interval;

determining an effect on a desired utility target responsive to the incremental increase; and repeating the operations of incrementally increasing the stream-specific minimum temperature approach value and determining an effect on the desired utility target, for each other of the hot process streams of the plurality of process streams.

19. Program product as defined in claim 11, wherein the plurality of process streams is a plurality of hot process streams, and wherein the operation of assigning a plurality of different combinations of stream-specific minimum temperature approach values comprises: iteratively assigning each minimum temperature approach value of a set of stream-specific minimum temperature approach values to each separate one of the plurality of hot process streams to thereby form the plurality of different combinations of stream-specific minimum temperature approach values, the set of stream-specific minimum temperature approach values comprising at least two minimum temperature approach values being different from each other.

20. Program product as defined in claim 11, wherein the plurality of process streams is a plurality of hot process streams, and wherein the operation of assigning a plurality of different combinations of stream-specific minimum temperature approach values comprises: associating each stream-specific set of minimum temperature approach values of a plurality of stream-specific sets of minimum temperature approach values with a different one of the plurality of hot process streams, and for each one of the plurality of hot process streams, iteratively assigning each minimum temperature approach value of the respective associated stream-specific set of minimum temperature approach values to the respective one of the plurality of hot process streams to thereby form the plurality of different combinations of stream-specific minimum temperature approach values, each set of minimum temperature approach values of the plurality of stream-specific sets of minimum temperature approach values including at least two minimum temperature approach values being different from each other, and at least one set of minimum temperature approach values of the plurality of stream-specific sets of minimum temperature approach values having at least one minimum temperature approach value different from each minimum temperature approach value for at least one other set of minimum temperature approach values of the plurality of stream-specific sets of minimum temperature approach values.

21. A method to optimize energy recovery for a process or cluster of processes having a plurality of resource streams, the method comprising the steps of:
assigning each of a plurality of different combinations of a plurality of stream-specific minimum temperature approach values to a same plurality of process streams, a substantial subset of the plurality of different combinations of stream-specific minimum temperature approach values each including at least one stream-specific minimum temperature approach value being different from at least one other of the stream-specific minimum temperature approach values within the respective combination of stream-specific minimum temperature approach values;
determining at least one global minimum energy utility consumption value for each combination of the plurality of different combinations of the stream-specific minimum temperature approach values assigned the plurality of process streams to thereby identify an optimal combination of stream-specific minimum temperature approach values assigned the plurality of process streams that render an optimal global minimum energy utility value; and
identifying the optimal combination of stream-specific minimum temperature approach values rendering the optimal global minimum energy utility value.

22. A method as defined in claim 21, further comprising performing at least one of the following:
determining a global minimum heating energy utility value rendered by the optimal combination of stream-specific minimum temperature approach values; and
determining a global minimum cooling energy utility value rendered by the optimal combination of stream-specific minimum temperature approach values.

23. A method as defined in claim 21,
wherein the optimal combination of stream-specific minimum temperature approach values is a first set of stream-specific minimum temperature approach values of one of the plurality of combinations of stream-specific minimum temperature approach values assigned the plurality of process streams that renders a global minimum heating energy utility value; and
wherein the method further comprises: identifying a second set of stream-specific minimum temperature approach values of another one of the plurality of combinations of stream-specific minimum temperature approach values assigned the plurality of process streams that renders a global minimum cooling energy utility value.

24. A method as defined in claim 23, further comprising the steps of:
determining a first set of discrete process conditions that renders the global minimum heating energy utility defining a first driving force distribution;
determining a second set of discrete process conditions that renders the global minimum cooling energy utility defining a second driving force distribution; and
calculating a first energy utility cost requirement associated with implementing the first set of process conditions and a second energy utility cost requirement associated with implementing the second set of process conditions, to thereby facilitate determining the optimal set of process conditions that provides a minimum total energy utility cost requirement.

25. A method as defined in claim 24, further comprising the steps of:
designing a heat exchanger network responsive to the determined optimal set of process conditions and one or both of the first and the second sets of stream-specific minimum temperature approach values; and
determining a capital cost associated with the heat exchanger network.

26. A method as defined in claim 21,
wherein the step of determining at least one global energy utility consumption value comprises: iteratively determining a separate global minimum heating energy utility value and a separate global minimum cooling energy utility value for each combination of the plurality of different combinations of the stream-specific minimum temperature approach values assigned the plurality of process streams; and
wherein the method further comprises, for each subset of a plurality of subsets of the plurality of combinations of stream-specific minimum temperature approach values, the step of: selecting a set of minimum temperature approach values from within the respective subset that renders a minimum increase in a more expensive global minimum energy utility value of the global minimum heating energy and the global minimum cooling energy values associated therewith over that of a prior selected set of minimum temperature approach values of a prior analyzed subset of the plurality of subsets of the plurality of combinations of stream-specific minimum temperature approach values.

27. A method as defined in claim 26, further comprising the steps of:
producing a capital versus energy cost Pareto-optimal chart providing indicia of a trade-off between capital cost and energy cost to thereby facilitate selection of an appropriate heat exchanger network, the Pareto-optimal chart comprising data points for at least one global minimum energy utility value for each of the plurality of different combinations of the stream-specific minimum temperature approach values assigned the plurality of process streams; and
providing expected utility purchasing requirements and capital costs associated with the selected heat exchanger network.

28. A method as defined in claim 21, wherein the steps of determining at least one global minimum energy utility consumption value for each combination of the plurality of different combinations of the stream-specific minimum temperature approach values and identifying the optimal combination of stream-specific minimum temperature approach values rendering the optimal global minimum energy utility value, comprise:
incrementally increasing a stream-specific minimum temperature approach value of a specific hot process stream of the plurality of process streams by a preselected temperature interval;

determining an effect on a desired utility target responsive to the incremental increase; and repeating the steps of incrementally increasing the stream-specific minimum temperature approach value and determining an effect on the desired utility target, for each other of the hot process streams of the plurality of process streams.

29. A method as defined in claim 21, wherein the plurality of process streams is a plurality of hot process streams, and wherein the step of assigning a plurality of different combinations of stream-specific minimum temperature approach values comprises: iteratively assigning each minimum temperature approach value of a set of stream-specific minimum temperature approach values to each separate one of the plurality of hot process streams to thereby form the plurality of different combinations of stream-specific minimum temperature approach values, the set of stream-specific minimum temperature approach values comprising at least two minimum temperature approach values being different from each other.

30. A method as defined in claim 21, wherein the plurality of process streams is a plurality of hot process streams, and wherein the step of assigning a plurality of different combinations of stream-specific minimum temperature approach values comprises: associating each stream-specific set of minimum temperature approach values of a plurality of stream-specific sets of minimum temperature approach values with a different one of the plurality of hot process streams, and for each one of the plurality of hot process streams, iteratively assigning each minimum temperature approach value of the respective associated stream-specific set of minimum temperature approach values to the respective one of the plurality of hot process streams to thereby form the plurality of different combinations of stream-specific minimum temperature approach values, each set of minimum temperature approach values of the plurality of stream-specific sets of minimum temperature approach values including at least two minimum temperature approach values being different from each other, and at least one set of minimum temperature approach values of the plurality of stream-specific sets of minimum temperature approach values having at least one minimum temperature approach value different from each minimum temperature approach value for at least one other set of minimum temperature approach values of the plurality of stream-specific sets of minimum temperature approach values.

* * * * *